United States Patent [19]
Bullwinkel et al.

[11] Patent Number: 6,099,317
[45] Date of Patent: Aug. 8, 2000

[54] DEVICE THAT INTERACTS WITH TARGET APPLICATIONS

[75] Inventors: Robert Allan Bullwinkel; John Scott Calhoun, both of Starkville, Miss.; Jack W. Griffin, Santa Clara, Calif.

[73] Assignee: Mississippi State University, Mississippi State, Miss.

[21] Appl. No.: 09/173,617

[22] Filed: Oct. 16, 1998

Related U.S. Application Data

[60] Provisional application No. 60/062,317, Oct. 17, 1997.

[51] Int. Cl.[7] ................................................. G06B 19/00
[52] U.S. Cl. ............................................................. 434/118
[58] Field of Search ............................ 434/118; 395/835, 395/838

[56] References Cited

U.S. PATENT DOCUMENTS

| | | | |
|---|---|---|---|
| 4,941,829 | 7/1990 | Estes et al. | 434/118 |
| 5,395,242 | 3/1995 | Slye et al. | 434/43 |
| 5,745,738 | 4/1998 | Ricard | 395/500.34 |
| 5,816,820 | 10/1998 | Heinz et al. | 434/118 |

*Primary Examiner*—Robert A. Hafer
*Assistant Examiner*—John Edmund Rovnak
*Attorney, Agent, or Firm*—Long, Aldridge & Norman LLP; Steven B. Kelber

[57] ABSTRACT

A method and system for monitoring a series of events performed in one or more applications on a computer. The recorded events enable users on the same or different machines to repeat the recorded events at a future time. The recorded events thus improve efficiency of an experienced user and/or demonstrate to a new user how more experienced users operate the application(s). The real-time sharing of recorded events allows multiple users to collaborate and "share" an application.

7 Claims, 17 Drawing Sheets

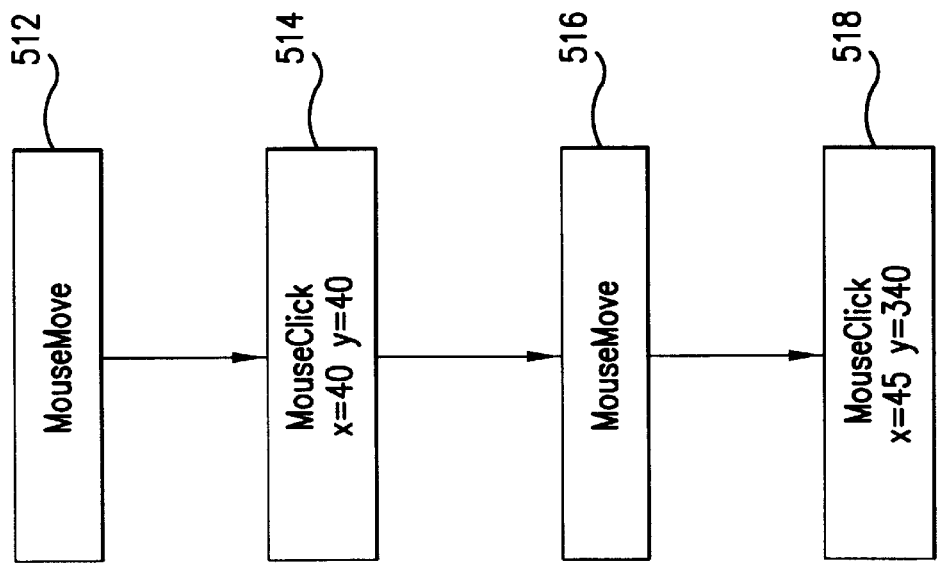
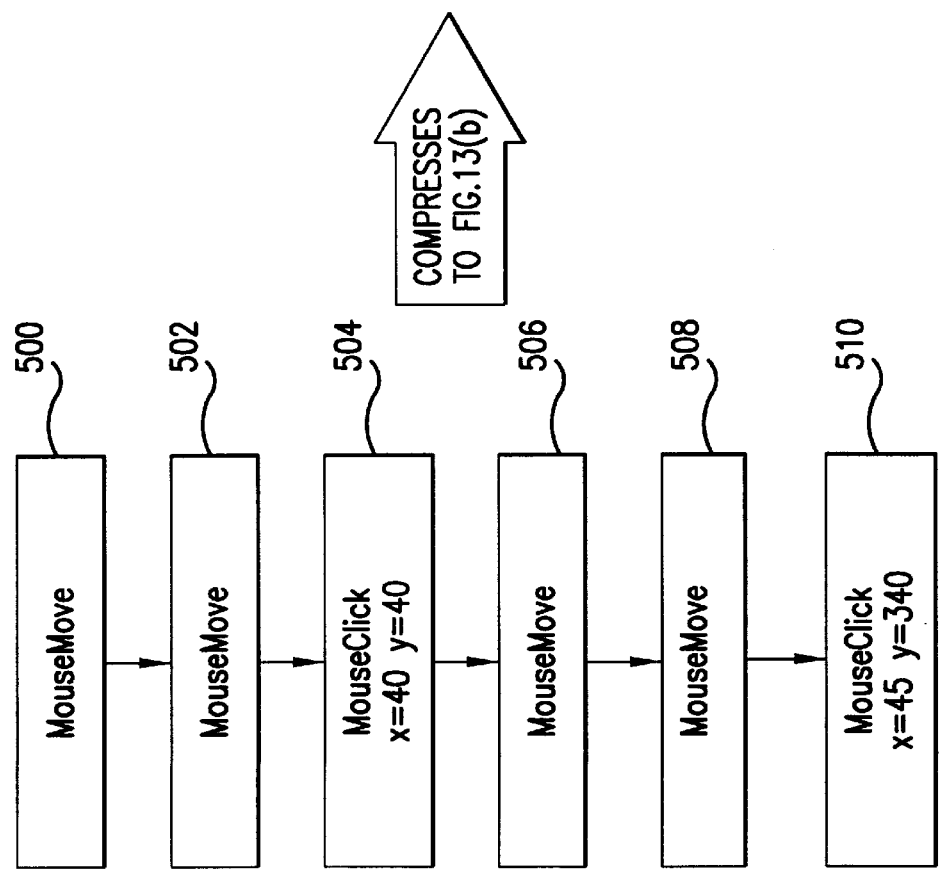

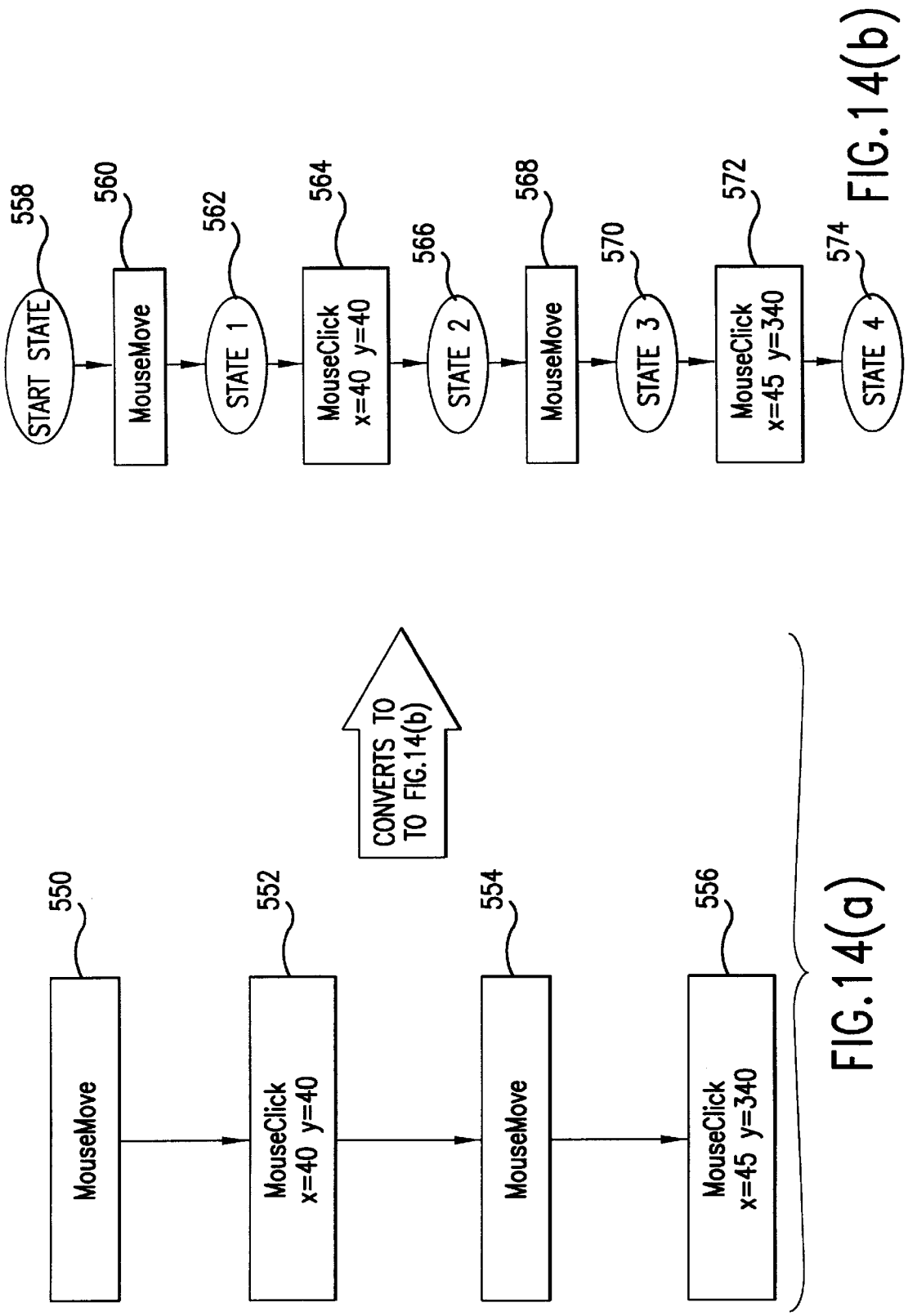

DEVICE THAT INTERACTS WITH TARGET APPLICATIONS

CROSS-REFERENCE TO CO-PENDING APPLICATION

The present application is related to and claims priority to U.S. Provisional Application Ser. No. 60/062,317, filed Oct. 17, 1997. The contents of that provisional application are incorporated herein by reference.

BACKGROUND OF THE INVENTION

1. Field of the Invention

The present invention relates to a method and system for recording, characterizing, and evaluating computer application usage.

2. Description of the Related Art

The explosive growth of information technology and increased industry dependence on computing resources will demand higher levels of computer literacy from the workforce. In addition, the rising demand for computer skills places an increasing premium on both computer literacy and an individual's ability to adapt his or her skill-sets quickly.

As used herein, the term "target application" refers to a computer program or application which a user desires to use or learn to use. Target applications include, for instance, editors, word processors, spreadsheets, browsers, Computer-Aided Design, and the like. A "user" then, is a person that uses, or is learning how to use, a target application. An "application engineer", on the other hand, refers to a person experienced in using a target application, such as a programmer or content developer at a company or organization. In addition, the term "supervising application" is the primary program or application that is used to provide instruction to a user regarding a target application. "Application Player/Recorder" (APR) refers to an implementation of the device that interacts with target applications.

Various types of tutoring systems have been developed in order to teach users how to use a target application. Many target applications are themselves equipped with information that instructs the user on the use of the target application. However, these instructions are standardized, and are not designed to be customized by an application engineer. Moreover, since these instructions are particular to a single application, they offer no assistance to interaction between various target applications that are typically used by a user One type of intelligent tutoring system is shown in U.S. Pat. No. 4,941,829 to Estes et al. ("Estes"), entitled "Method For Providing A Dynamic Tutorial Display". Estes was designed to train a user in the utilization of interactive software applications having dynamic displays. Sequences of selected operator inputs are recorded, along with the elapsed time between successive inputs. If a user requests assistance, the software application will respond in a manner identical to a response generated by human input from an experienced operator.

However, Estes is a technical assistant rather than an informed supervising application. Estes suggests an answer to a user's problem in the form of a voice or textual description. However, Estes does not evaluate the user's performance within a target application, and does not have the ability to graphically demonstrate how to perform an action within the application. Furthermore, Estes is limited to use with a single target application, so that it offers no assistance to users that are learning or interacting with multiple target applications.

SUMMARY OF THE INVENTION

In order to overcome the disadvantages of the prior art, the present invention is capable of recording, playing, and evaluating various sequences of operator inputs within multiple target applications. Organizations can use these expanded capabilities in many areas such as training employees to use computer applications or monitoring employee efficiency while using computers to perform work tasks.

Accordingly, developers of computer-based training for applications could use APR to demonstrate various uses of the target application to users. For instance, a secretary could be shown how to create a particular type of report using a word processor. Using APR, this type of information can be conveyed without the presence of an informed user of the word processor. The APR can also be used to evaluate a user's ability to perform tasks within the application. Continuing with the prior example, the secretary could be asked to create a sample report in the word processor at the end of her training; APR would be able to evaluate the actions of the secretary within the word processor to determine if she performed the required sequence. Such information and capability allows for the development of advanced training for computer applications without requiring the presence of an informed user of the target application.

APR technology can be used in genres other than computer-based training for applications. Consider a company that wishes to regularly evaluate the efficiency of employees using computer applications; APR could be used to monitor the actions of the employees to determine whether they use the target applications in an efficient manner. Then, the company can use this information to determine which employees need training in the target applications.

Consider yet another scenario where a company has many employees using computer applications to perform the same tasks repeatedly. Twenty-five percent of the employees are extremely efficient workers; APR could be used to monitor the efficient workers to record the process by which they use the computer applications to perform their job. This data could then be used to develop training material that teaches the less-efficient employees better processes for using the target applications to perform their job.

Accordingly, it is a primary object of the present invention to provide a device that can playback, record, and evaluate operator inputs to target applications.

It is another object of the invention to provide a device that can characterize target applications.

It is another object of the invention to provide a device that can interact with existing target applications.

It is a further object of the invention to provide a device that can demonstrate the operation of target applications to users, independent of whether or not the target application independently contains assistance information.

Another object of the invention is to provide a device that is able to evaluate a user's performance within a target application.

It is yet another object to provide a device that is able to graphically demonstrate how to perform an action within a target application.

In accordance with these objectives the present invention, Application Player/Recorder (APR), is a device that provides the ability to dynamically interact with and monitor arbitrary computer applications. APR allows application engineers to capture, manipulate, and playback application command sequences, or operator input, much like audio, video, or any other media that are recorded, manipulated, and played back. APR operates by interpreting the events and messages passed between the operating system and the target applications. Using this information, APR determines which applications are active, which windows have been created and destroyed, and the user's interaction with these windows and applications.

An application must be characterized before the APR is able to evaluate a user's actions within the specified target application. To characterize an application, command sequences, or actions, within that application are recorded and given meaningful labels. After this process, the APR will recognize those actions when repeated by a user of the characterized application. After an application has been characterized, the APR can intercept the events going to and from the target application and determine the high-level, logical action being performed by the user.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIGS. 13(a) and 13(b) are storyboard flow diagrams sequences in accordance with FIG. 9.

FIGS. 14(a) and 14(b) are storyboard flow diagrams illustrating the process of converting a sequence of events into a Finite State Machine (FSM) in accordance with FIG. 10.

DETAILED DESCRIPTION OF THE PREFERRED EMBODIMENTS

Figure 1:
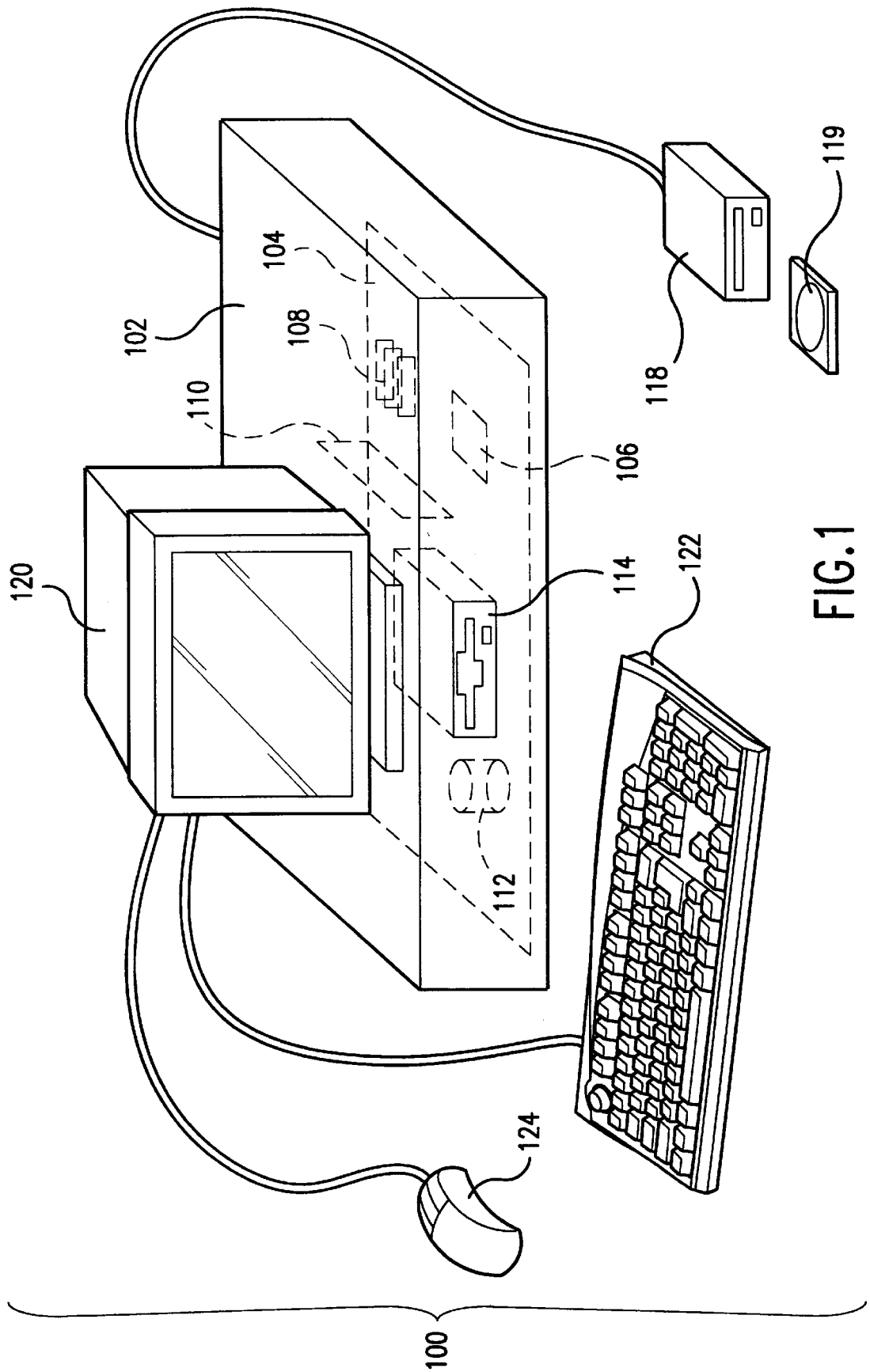
FIG. 1 is a schematic illustration of a computer for implementing an Application Player-Recorder (APR) according to the present invention.

Referring now to the drawings, wherein like reference numerals designate identical or corresponding parts throughout the several views, FIG. 1 is a schematic illustration of a computer system for implementing an APR system. A computer 100 implements the method of the present invention, wherein the computer housing 102 houses a motherboard 104 which contains a CPU 106, memory 108 (e.g., DRAM, ROM, EPROM, EEPROM, SRAM, SDRAM, and Flash RAM), and other optional special purpose logic devices (e.g., ASICs) or configurable logic devices (e.g., GAL and reprogrammable FPGA). The computer 100 also includes plural input devices, (e.g., a keyboard 122 and mouse 124), and a display card 110 for controlling monitor 120. In addition, the computer system 100 further includes a floppy disk drive 114; other removable media devices (e.g., compact disc 119, tape, and removable magneto-optical media (not shown)); and a hard disk 112, or other fixed, high density media drives, connected using an appropriate device bus (e.g., a SCSI bus, an Enhanced IDE bus, or a Ultra DMA bus). Also connected to the same device bus or another device bus, the computer 100 may additionally include a compact disc reader 118, a compact disc reader/writer unit (not shown) or a compact disc jukebox (not shown). Although compact disc 119 is shown in a CD caddy, the compact disc 119 can be inserted directly into CDROM drives which do not require caddies. In addition, a printer (not shown) also provides printed listings of recorded events and/or finite state machines.

As stated above, the system includes at least one computer readable medium. Examples of computer readable media are compact discs 119, hard disks 112, floppy disks, tape, magneto-optical disks, PROMs (EPROM, EEPROM, Flash EPROM), DRAM, SRAM, SDRAM, etc. Stored on any one or on a combination of computer readable media, the present invention includes software for controlling both the hardware of the computer 100 and for enabling the computer 100 to interact with a human user. Such software may include, but is not limited to, device drivers, operating systems and user applications, such as development tools. Such computer readable media further includes the computer program product of the present invention for implementing an APR system. As discussed in more detail below, the computer code devices of the present invention can be any interpreted or executable code mechanism, including but not limited to scripts, interpreters, dynamic link libraries, Java classes, and complete executable programs.

In a preferred embodiment, the present invention utilizes (1) an event-driven, windowing-based graphical user interface and (2) a mechanism to intercept events communicated between the graphical user interface and an application. The graphical user-interface may either (1) be incorporated into or bundled with an operating system, as in Microsoft Windows, or (2) exist as a separate component that utilizes underlying operating system services, as in the X Windows system running on top of UNIX or a UNIX-variant. In the preferred embodiment, based on the graphical user interface for the Microsoft Windows operating system, "hooks" enable events (including both mouse and keyboard events as well as windows events when windows are created, moved, resized, or destroyed) to be intercepted for subsequent analysis and/or recordation. The present invention, however, is not limited to event-driven environments or environments with hooks per se. Alternate embodiments of the present invention include environments in which the information is captured through any one of, or a combination of, techniques including redirection of interrupt services, redirection of BIOS or operating system routines, and device drivers.

Figure 2:
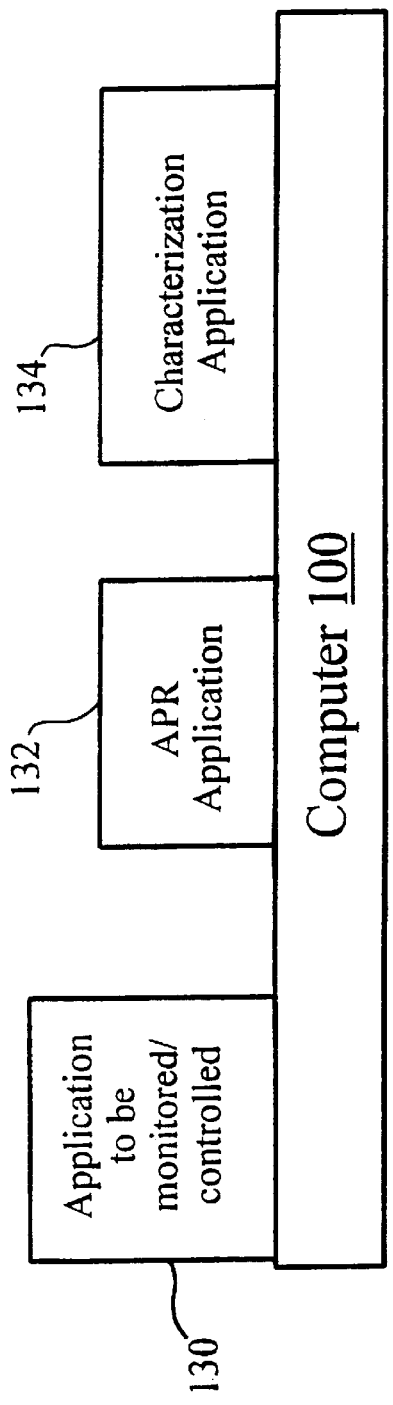
FIG. 2 is a schematic illustration of the computer of FIG. 1 running the APR system of the present invention.

As shown in FIG. 2, in the preferred embodiment, APR technology is implemented using two applications: (1) an APR application 132 that performs playing, recording, and evaluating, and (2) a characterization application 134 that generates the finite-state machine representation of an application characterization. As a player and recorder of application sequences, the APR application 132 can be used in several ways. The APR application 132 can be used to create and play macros to interact with the application 130, the desktop, multiple applications, or a combination of these. As an example, a macro could be created to load a template in Microsoft Word, export the template to HTML, and finally import the exported HTML into Microsoft Frontpage Explorer. To do this, the APR application 132 would record this sequence of actions. Then, once recorded, the sequence is saved and can be played at other times as a macro.

Figure 3:
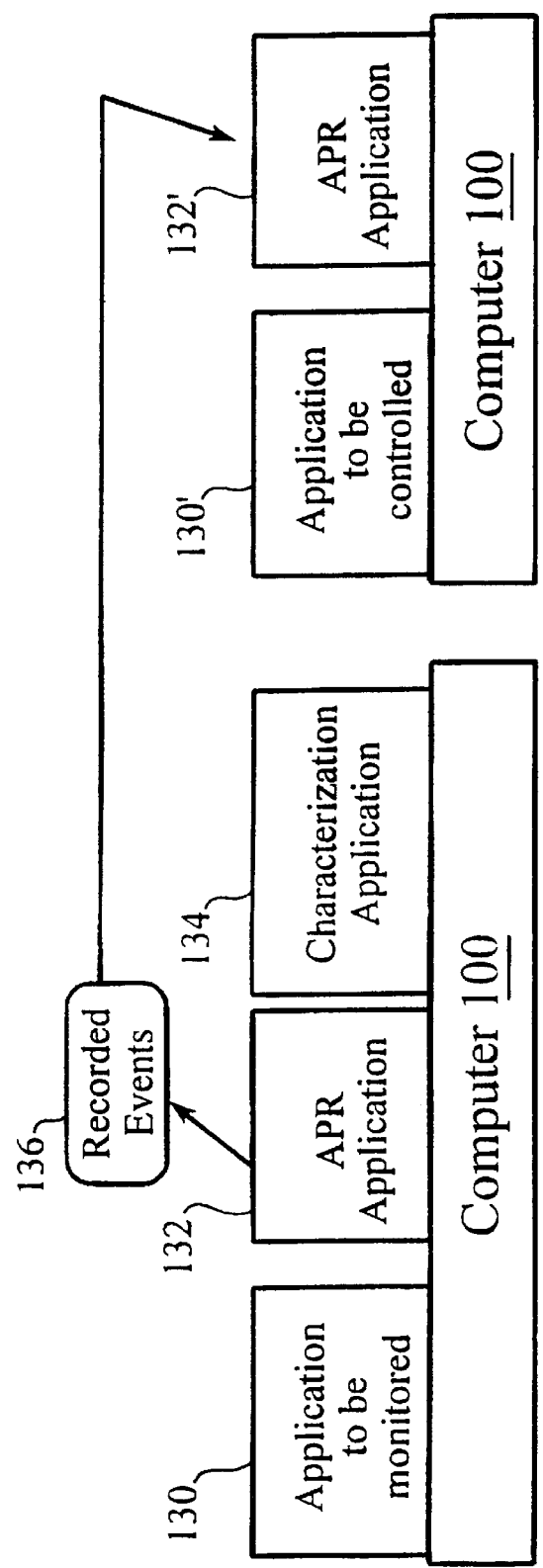
FIG. 3 is a schematic illustration of events recorded on a first computer being sent to a second computer for execution.
Figure 4:
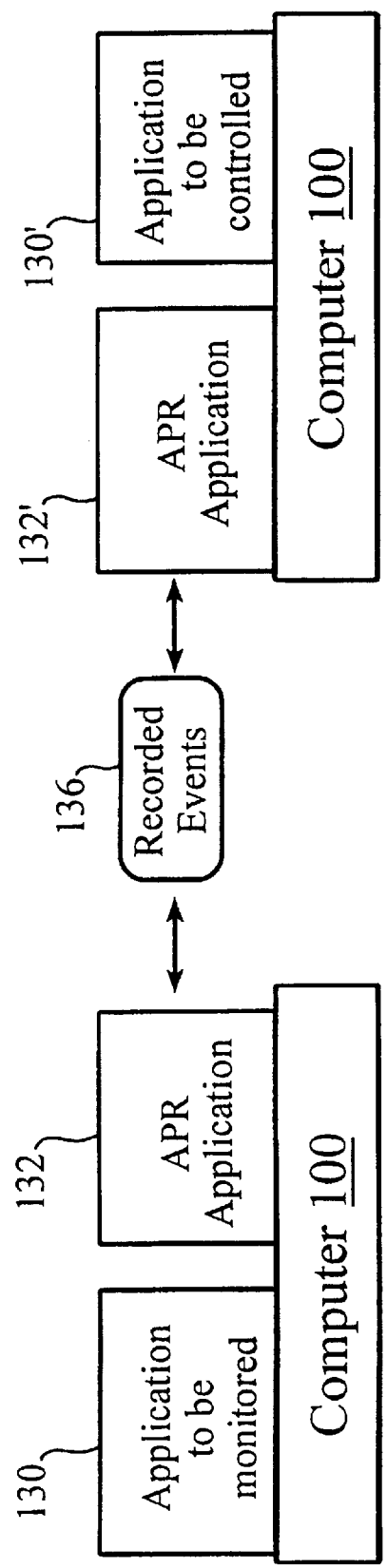
FIG. 4 is a schematic illustration of events being shared between applications to enable two users to virtually share the same application.

FIG. 3 depicts how another potential use of the APR technology is to provide demonstrations of various application sequences. Consider user A, who wants to perform a certain task using a particular application. User B, who knows how to perform this particular task, uses the APR application 132' to record the events 136 that describe how the task is performed. Then, user B sends the recorded events 136 to the APR application 132 of user A so that user A can playback the events 136 to learn how to perform the task. In this model, the APR technology is used as a demonstration tool; this type of approach could prove to be very useful and significant for providing off-site technical support to users of various Windows-based applications.

With slight modification to the above-described APR tool, the system allows users to share an application over a network. In such a mode, two users are at separate computers 100 on a network. Both users run a local copy of the same application from their desktop. The modified APR applications (132 and 132') run on the users' respective machines, recording the events 136 that are performed within the target applications (130 and 130'). As these events 136 are recorded, they are sent to the other user's APR application. When the APR application receives a sequence of events, it can play this sequence of events so that the applications maintain the same state on both machines. Currently, applications are shared in this manner by sending a display of one application to the other user's desktop; this solution has a high bandwidth requirement. Another solution is to have built-in support for application sharing, which limits the number of applications that can be shared since most common applications do not have such support. The APR approach provides a low-bandwidth solution to the application sharing problem; it simply requires that both users have the shared application installed on their machine.

The previous examples of utilizing APR technology only required the playing and recording aspects of APR. The evaluation capability allows for additional applications of APR technology. For example, a user may take an online tutorial on the world-wide web about how to use Microsoft Word. For demonstration and evaluation purposes, the APR application 132 is downloaded as either a complete application or as an ActiveX component or plug-in. Then, several application events (or sequences) are played to demonstrate to the user how to create a new document in Word. Then, the user is asked to create a new document in Word; at this point, the characterization application 134 (which is either a separate application or may be built into the APR application, component or plug-in) changes into evaluation mode. In that mode, the characterization application 134 records the user's action and traverses the application characterization finite-state machine to determine what the user is doing. If the characterization application 134 determines that the user successfully created a new document, the tutorial is allowed to proceed to the next topic. If the user failed to successfully create a new document, the characterization application 134 informs the tutorial so that appropriate actions can be taken, such as illustrating the process to the user again with more explanatory detail. In this model, the APR technology is used to provide demonstrations for training purposes and is then used to evaluate the user's abilities after the training.

As an extension of the previous example, another method for using the characterization application 134 (or a general evaluation method) of the APR system is to provide unobtrusive monitoring of users. In this model, the APR runs in the background on a user's computer and maintains a record of the user's action within particular applications. This data can be used to monitor a user's efficiency using applications in the workplace or to learn how a particular user performs tasks in an application. This evaluation can also be extended to provide assistance to the user, it may be determined by APR that the user is performing a certain task in an inefficient manner. In such case, the APR could then be used to illustrate to the user a more efficient way of performing the task. Then, the user can be asked to retry the action using the new method. Thus, APR method can monitor this sequence to determine if the user has correctly learned the new method for performing the task.

The APR can also be used to perform workplace simulation. In this embodiment, the desktop for an employee is setup to deliver tasks to the employee online. The employee then performs these tasks using various applications. The APR monitors the user, as described in the previous extended example. However, given this synthetic working environment, the APR performs user training without the user realizing they are being trained. Training tasks, thus, are provided to the user as work tasks. Hence, the user learns how to perform new tasks, or improve performance, without realizing that active training is occurring. In this model, the APR is used to help simulate a working environment where tasks are provided to the user. As the user's performance is evaluated, training tasks may be embedded in work tasks targeted to improve the user's performance in various ways.

The characterization application 134 also helps a user characterize an application as discussed below. The tool allows the user to record and label sequences, and these sequences are added to the finite-state machine representation for the target application. Once the user is satisfied with the degree of detail in the finite-state machine, construction can stop. The characterization then is used by the APR tool to perform various evaluation tasks, as described above.

Generally, the APR system is designed to allow users, such as company application engineers, to capture, manipulate, and play back target application command sequences much in the same way as audio, video, or any other media is recorded, manipulated, and played back. The APR system uses a characterization process to interact with the target applications. Preferably, APR is implemented on an event or message driven operating system. Accordingly, the APR software receives various events and/or messages from the operating system to indicate the condition of the target applications.

These events indicate to the APR, for instance, that certain windows have been moved, resized, created, destroyed, iconified, or that the mouse cursor has moved, a mouse button clicked, a key pressed, and the like. Thus, the APR is able to evaluate a user's actions in any target application that has been characterized.

Figure 5:
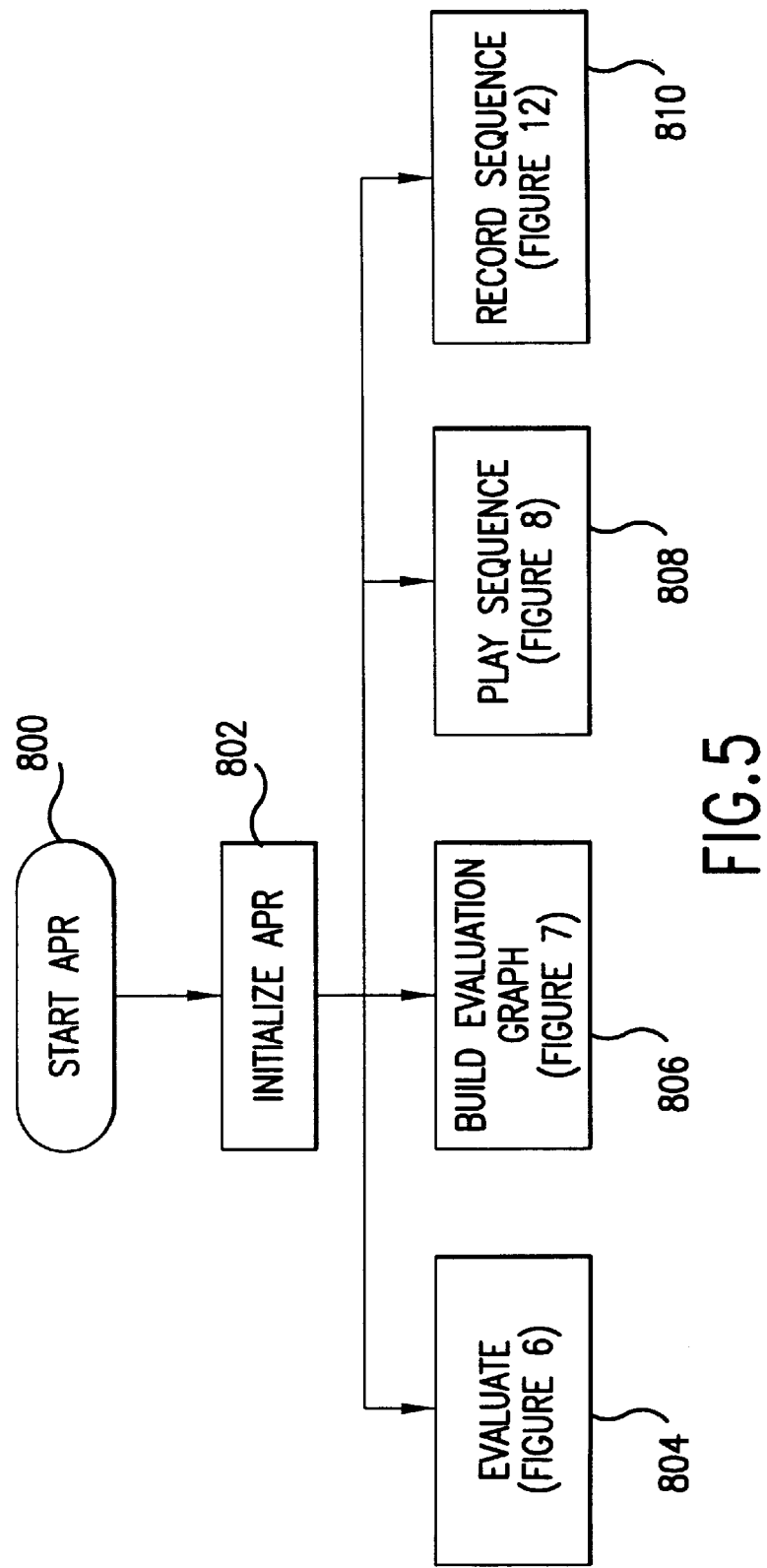
FIG. 5 is a general flow diagram showing the various modes of operation of the Application Player-Recorder (APR) of the preferred embodiment of the invention.

As shown in FIG. 5, APR essentially has four (4) main modes of operation: Evaluate 804, Build Evaluation Graph 806, Play Sequence 808, and Record Sequence 810. Upon loading, step 800, APR initializes itself by locating the target applications, step 802. The target applications may be identified, for instance, by having the user select them from a list of applications located on the client system.

Once the user selects a target application, the system determines whether that application has been characterized before. Generally, characterization is the method in which the supervising application, APR, recognizes a target application. For new characterizations, the user is required to select a target application from a list of open target applications. For previously characterized applications, the target application is sought. If the application is not currently loaded, the user is asked to do so. Preferably, only the application engineer may edit or create a characterization. Once initialization has been performed, the user (or application engineer) may select to enter any of the modes of operation, 804–810.

The APR is preferably implemented by C++ and WIN32. Since there is no widely accepted graphical desktop environment standard, Windows 95 was selected since it is one of the most popular graphical desktop environments.

Build Evaluation Graph

Figure 7:
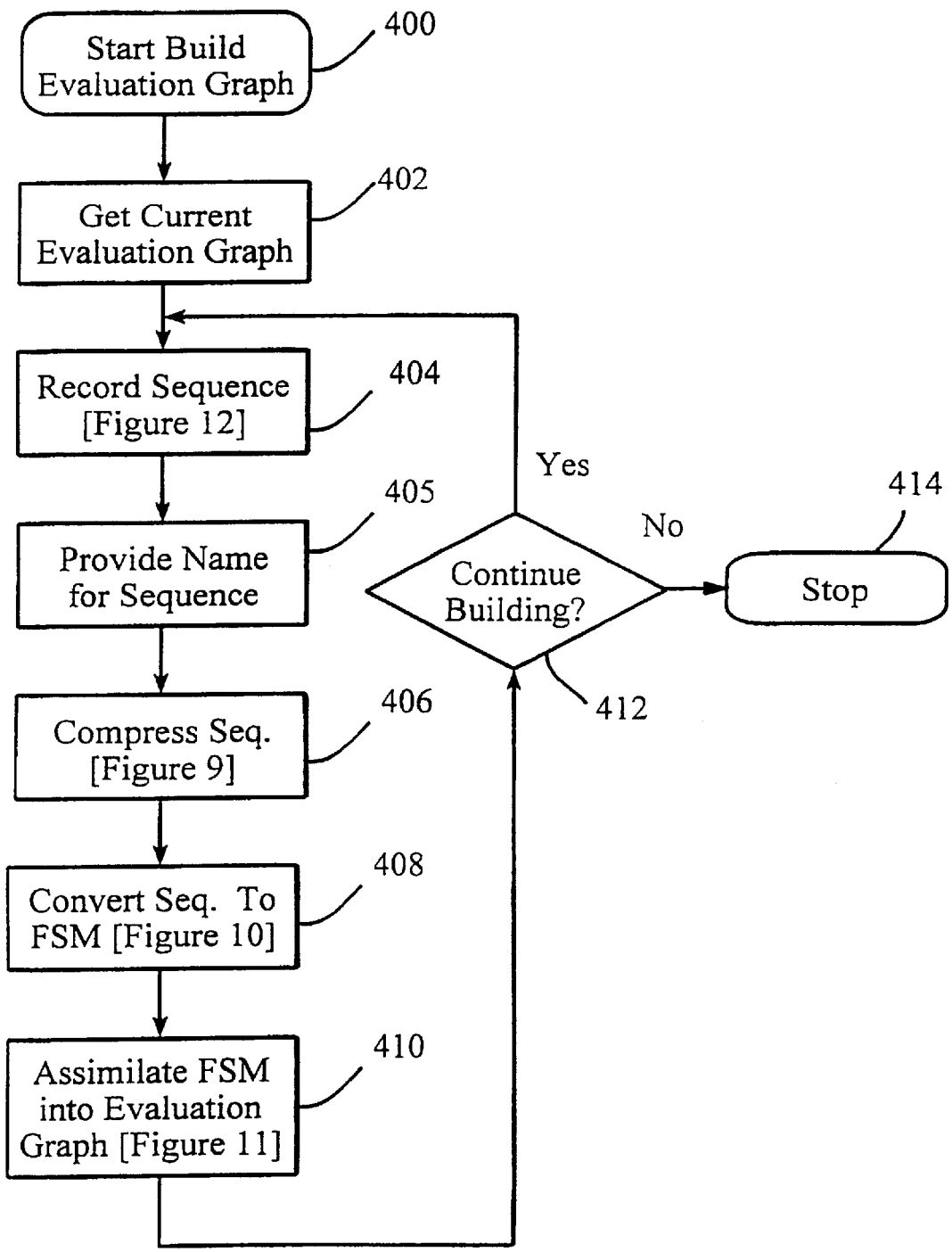
FIG. 7 is a flow diagram showing the process of building an evaluation graph.

Turning first to FIG. 7, the process for building an evaluation graph will now be described. At step 400, if the user has selected to record a sequence, the system will proceed first to build an evaluation graph. First, the system searches for an existing evaluation graph, step 402. To begin developing the evaluation graph, or master FSM, sequences are recorded, step 404. Typically, to provide a general characterization of a target application, the application engineer would record the most simple operations that can be performed in the target application.

A simple operation would be, for instance, the action of clicking a File menu in a target application. This action only causes the File menu to popup, and is not often performed by itself. However, it is a logical action that is performed in a target application, so that a application engineer would want to record it.

Once the first sequence, which generally consists of multiple events, is recorded, step 404, and named, step 405. In evaluation mode, this information is then output by the APR when that particular state is reached in the evaluation graph or FSM. Next, the sequence must be converted to an FSM, steps 406, 408. This FSM will serve as the beginning of a master FSM. The FSM is assimilated into the evaluation graph, step 410. Of course, for the initial sequence that is recorded, the assimilation step may be skipped since assimilation is only used to combine two FSMs, into a single FSM. Now, another operation sequence may be recorded that is unrelated to the one just recorded, step 412, or the building may end, step 414.

After the user records a second sequence, step 404, the system compresses the second sequence, step 406, and converts it to an FSM, step 408. The new FSM is then assimilated with the first master FSM, created in the previous cycle. The process of recording sequences and assimilating them into the master FSM is repeated until the application engineer or user is satisfied with the characterization of the target application.

Evaluate Mode

Figure 6:
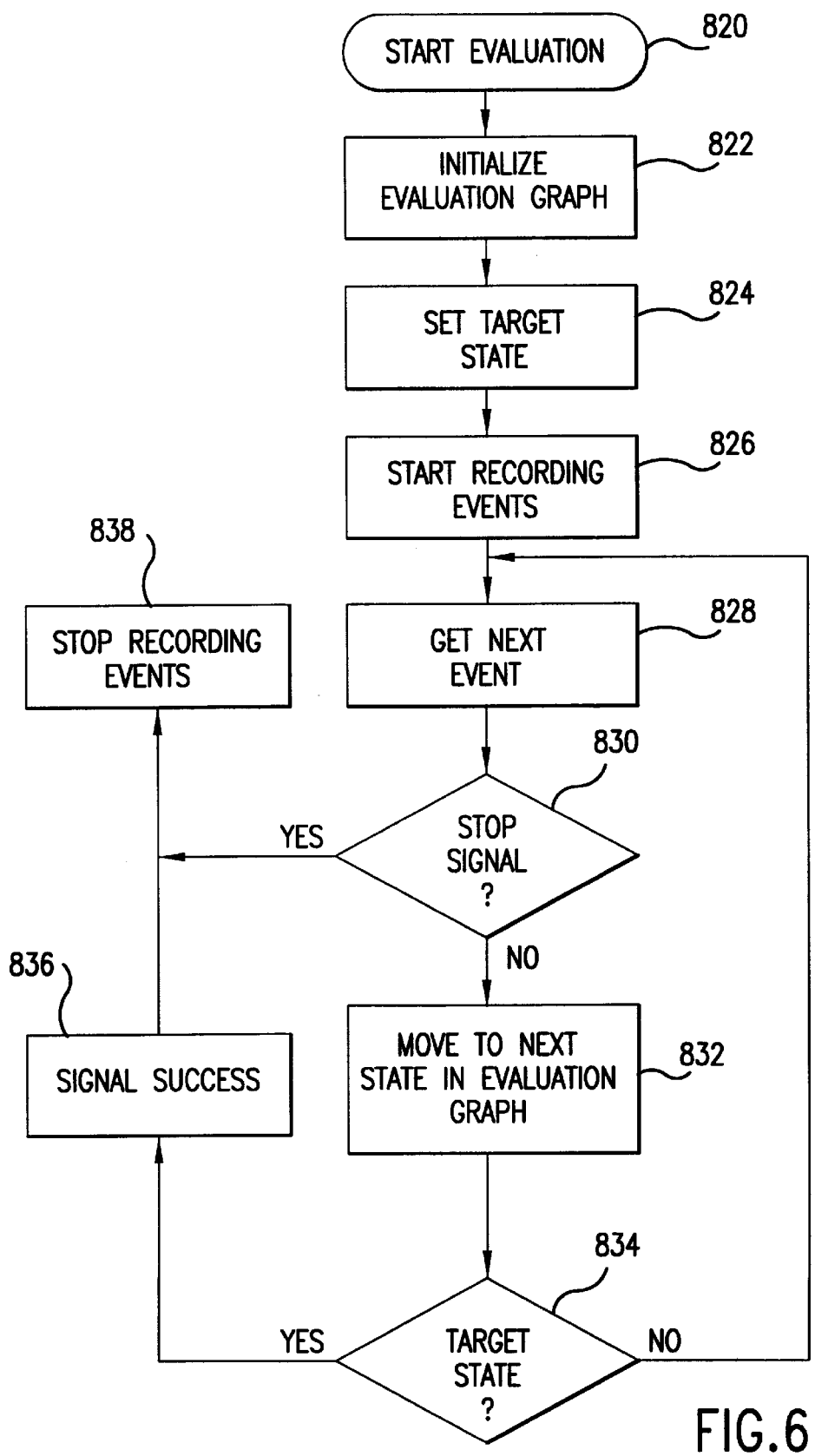
FIG. 6 is a flow diagram showing operation of the Evaluate Mode for the APR system shown in FIG. 5.

Referring back to FIG. 6, APR can evaluate the user's actions in a target application that has been characterized properly. In this mode, the APR simply monitors events or messages that are sent to the target application and uses them as inputs to the evaluation graph in order to determine the actions performed by a user. For each event or message received, the APR will potentially change state, depending on the content of the message or event. The user or application engineer enters the evaluate mode and selects the action to be tested. For instance, the application engineer, in authoring a tutor, may provide a target state that tests the user's ability to perform the function of File Open.

Accordingly, at step 820, the evaluation process is started. The evaluation graph associated with the target application is initialized, step 822, and a target state is set, step 824. A Finite State Machine (FSM) is used to evaluate the user's actions. Thus, a target state must be set. If the target state is obtained while monitoring the user's action, the user has successfully performed a desired action.

At step 826, APR begins to monitor all events and messages performed by the user in the target application. Thus, the system starts by getting a first event, step 828. If a stop signal is received, step 830, the system will stop recording events, step 838, and the evaluation mode ends.

Absent a stop signal, step 830, the event is given to the evaluation graph as an input, and the evaluation graph may possibly move to a different state, step 832. A stop signal may be received, for instance, by the user in order to quit the evaluation. Or, the system may generate a stop signal if the user doesn't perform the desired action within a certain time frame. The system then determines whether the target state has been reached due to the last state transition, step 834, and, if not, will return to step 828 where it awaits the next event. The system will continue to process events until the target state is reached, step 834, or a stop signal received, step 830.

Once the target state is reached, indicating that the user has successfully performed the desired action, the system proceeds to step 836. At step 836, the system indicates to the user that the user has successfully performed the desired action.

Thus, the evaluate mode determines if an event was successfully performed by the user. However, the evaluate mode is also used to record the user's actions and determine what the user has done. The state graph will have certain states that provide useful information about the user's actions (e.g., such as File button clicked, Help button clicked, etc.).

As with other modes of operation, a tutor may be authored by a application engineer to use evaluate in a variety of manners. For instance, a tutor may be authored that simply sits in the background and unobtrusively monitors the user's action. The evaluation could determine whether the user is performing a certain action and, more importantly, whether the user is performing this action in an inefficient manner. The tutor may then interrupt the user and ask whether the user would be interested in learning a more efficient method for accomplishing the task they have been performing. Accordingly, various implementations of the invention will become readily apparent.

Window-Map

According to the preferred embodiment, when utilizing a windowing system, events must not only be recorded, events must be correlatable to their intended windows. In order to perform that correlation, each window must be uniquely identifiable. Typically an application utilizes multiple windows as part of its user-interface. These windows include, but are not limited to, the title bar, the menu bar, and an application's main window. When each window is created, the graphical user interface generates, and then maintains, a handle to that window for the purpose of identification. Thus, the application's handles can be retrieved when a sequence is recorded. However, each handle is also specific to the instance of the application in which it is created. More specifically, handles may change between machines, and even change between different instances of the same application on a single machine.

Thus, the present invention utilizes a technique to identify windows independent of their instance-specific window handles. Accordingly, the present invention provides a tracking technique using "window-maps." A window-map is a hierarchy of the windows (and their corresponding characteristics) in a target application and is analogous to an application's identification or "thumbprint." Various information about an application's windows is maintained, such as window names, window-class names, positions, sizes, parent windows, and child windows. Application designers should consider the need to differentiate between the various windows in a target application when designing and naming windows in an application to avoid naming conflicts, it is possible to create a centralized registry of unique application name prefixes for all application developers to use. In this way, all Microsoft applications would use windows with names beginning with "MSFT" while Adobe applications would all begin with "ADBE." Each window in the application should be given a unique name such that all windows are uniquely identifiable. If multiple instances of the same user interface can be present at the same time (e.g., browsers that support replicated windows), window-map creation is eased if an instance number is placed within the window name. For example, rather than using MSFT.Explorer.window1 (which would exist for both occurrences of a browser window), the two instances could instead be named MSFT.Explorer.1.window1 and MSFT.Explorer.2.window1. Accordingly, if the windows in the target application can be differentiated based upon this information, then sequences can be successfully recorded, played back, and evaluated within the corresponding target application.

However, if the window-map is unable to differentiate between certain windows, then either (1) those windows cannot serve as recipients of events in an event-sequence or (2) additional information must be provided by the user to distinguish between windows. Thus, it is possible that the present invention would not be able to interact with certain applications, given that a unique identification cannot be created for the application.

Although, the above discussion of window-maps relates to windows within a single application, the present invention is similarly directed to interacting with multiple applications in sequence. In that case, a "super" window-map is created that contains the window-maps of all applications utilized in the sequence.

Record Sequence

In one embodiment of the present invention, prior to starting any application whose interactions are to be recorded, the APR application 132 of the present application is started. Accordingly, the APR application 132 can analyze the order of creation of windows in the applications to be analyzed/controlled. In an alternate embodiment, the APR application 132 is started after the target application(s), and the dynamic information about the ordering of created windows is unavailable for the window-map.

The record sequence will now be described with reference to FIG. 7. The process of recording sequences occurs as part of building an evaluation graph, step 404 of FIG. 7, but may also be part of the general operation of the system, block 110 in FIG. 5. Once a "start record" signal has been received, step 850, the system begins recording events, step 852. If a stop signal is received, step 856, the system stops recording events step 858. However, absent a stop signal, step 856, the system will process the event, step 859, and add the processed event to the event sequence, step 860. The system will continue to get events, step 854, process events, step 859, and add the events to the sequence, step 860, until a stop signal is received, step 856.

At step 859, each recorded event is processed, which entails retrieving the type of event (e.g., RightMouseClick or CreateWindow) and getting any information that may be needed depending upon the type of event. For instance, when a RightMouseClick event is received, the coordinates of the mouse click are retrieved. It is also necessary to retrieve the target window of the event, or the window to which this event will be delivered. If the target window does not already exist in the window-map for the target application, then it is added.

In this manner, the events (or commands) of the target application(s) are captured as a sequence. The sequences are recorded and stored internally in the system, such as in an identifiable location in a database. Sequence editing is also accomplished with the APR application 132. Application sequences can be partitioned to allow user sequences to be matched against the partitioned sequence. A typical tutor will be built around the recording and playback of the target application.

For example, a tutor may be authored to train an individual in the use of Microsoft Excel to capture and accumulate quality control data for a manufacturing process line. The authoring of the tutor begins with the use of the APR application 132 to record the complete application command sequence that performs the target task. The complete application command sequence can then be broken up into smaller command sequences with the use of the APR application 132. These smaller sequences can then be played back by the APR application 132 to guide the user through the learning process.

Play Sequence

Figure 8:
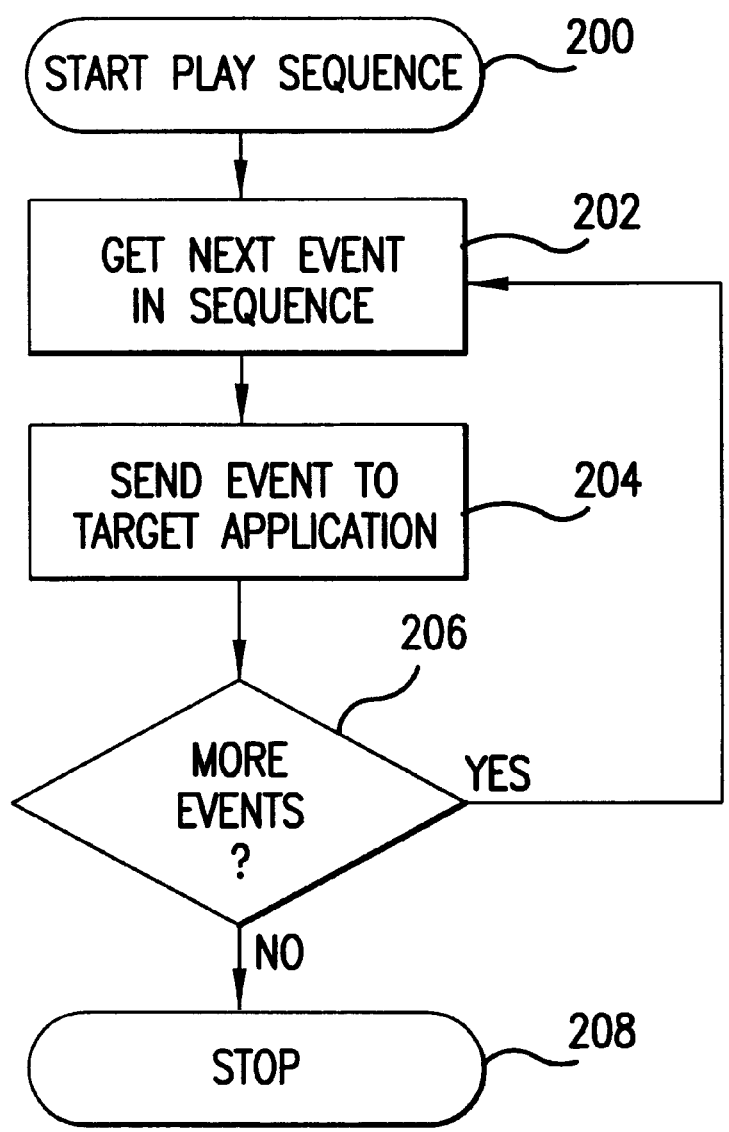
FIG. 8 is a flow diagram showing operation of the Play Sequence Mode for the APR system shown in FIG. 5.
Figure 12:
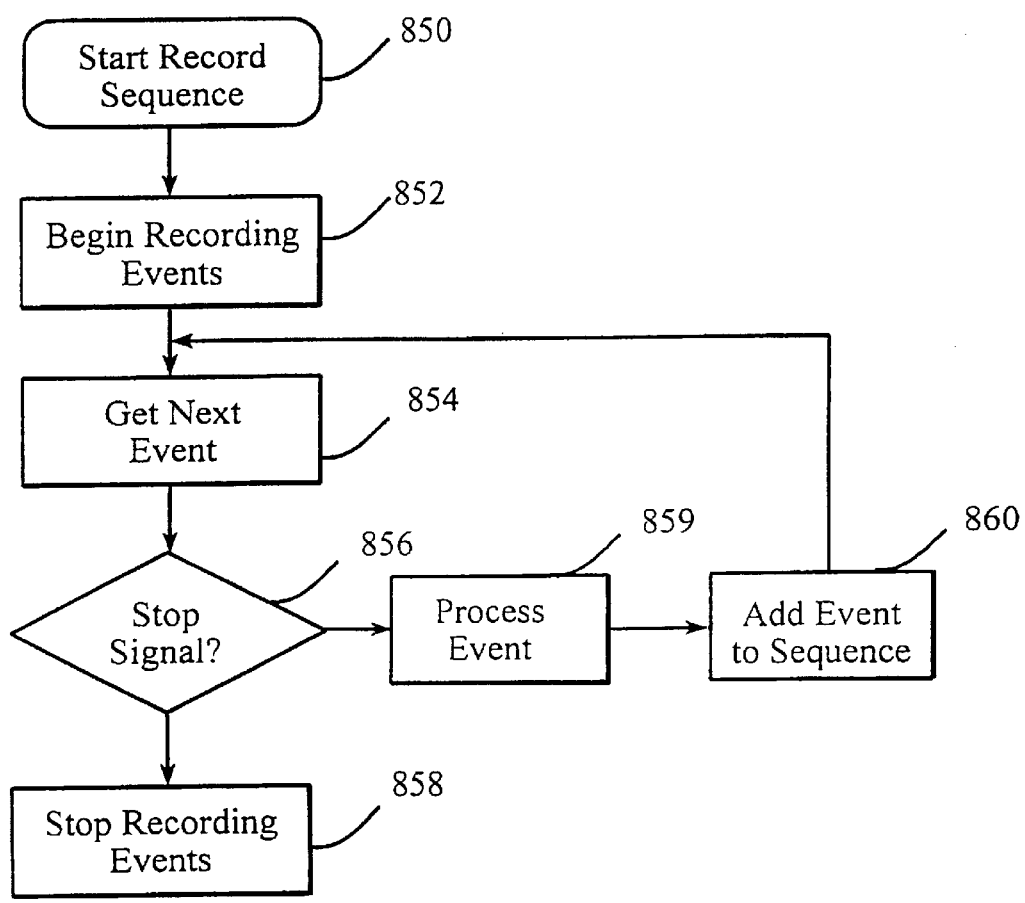
FIG. 12 is a flow diagram showing operation of the Record Sequence Mode for the process of building evaluation graphs in FIG. 7.

The process of playing a sequence is shown in FIG. 8. Of course, a sequence can only be played after it has been recorded, as described with reference to FIGS. 7 and 12. At step 200, the play sequence is started. At step 202, the system retrieves the next event in the sequence to be played. Based on the window information in the window-map that was stored for the retrieved event, the APR application 132, in step 203, searches the existing windows in the graphical user interface to determine which existing window corresponds to the window that originally received the event during recording. Once the target window is found, the event is "played" by sending the event to the target window, step 204. If there are additional events to play, the system returns to step 202. Otherwise, if the play sequence has ended, the system stops at step 208. Clearly, though, if a target window cannot be found, the sequence cannot be properly played back.

Compress Sequence

Figure 9:
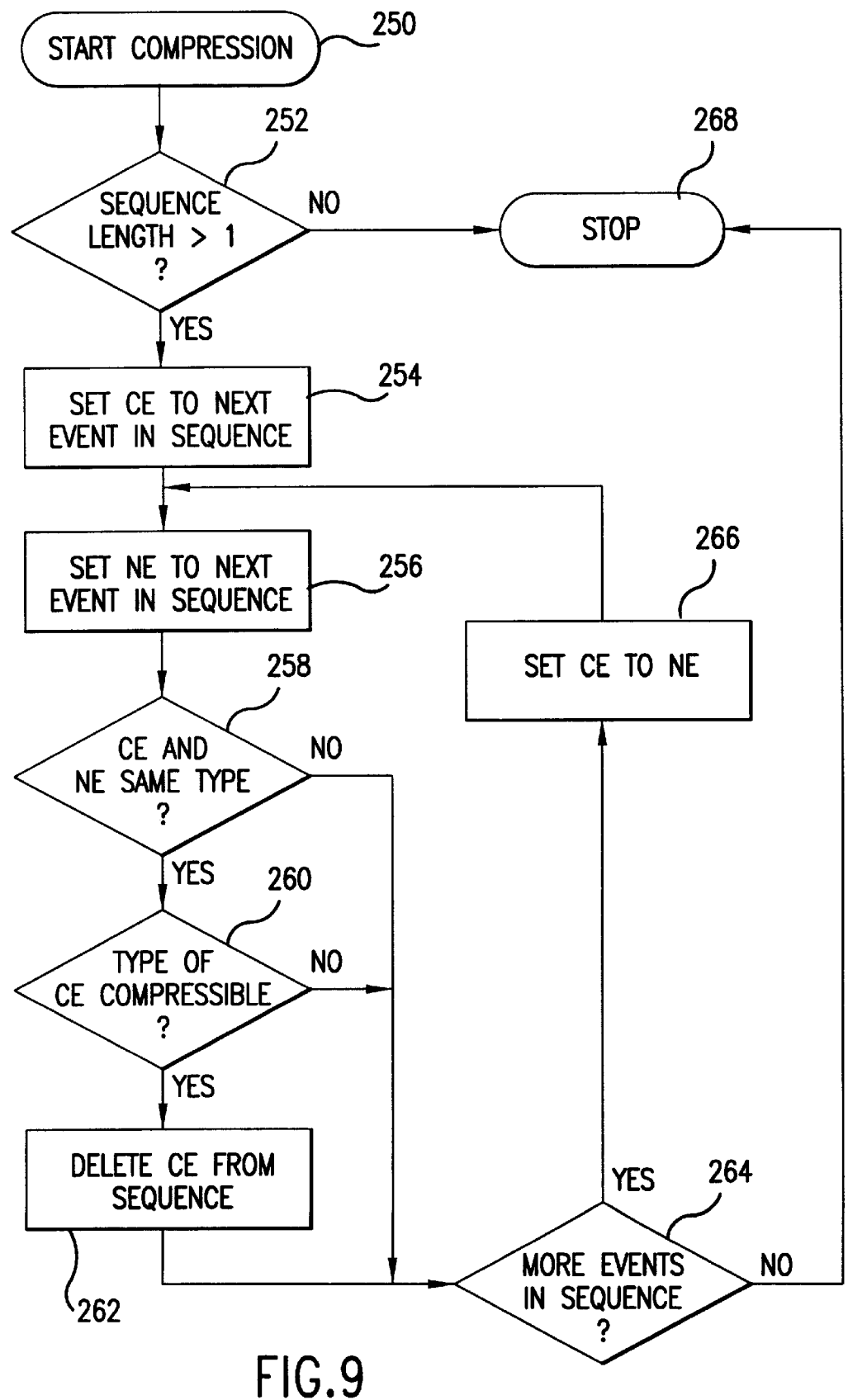
FIG. 9 is a flow diagram showing operation of the Compress Sequence Mode used to build the evaluation graphs of FIG. 7.

By the process illustrated in FIG. 9, redundancies are removed from FSMs. The compress sequence mode is started once a sequence of events is received that is to be compressed, step 250. If the sequence only has one event, step 252, there is nothing to compress and the compression mode ends, step 268.

Assuming that there is more than one event in the sequence, the system sets Current Event (CE) to the next event in the sequence, step 254. CE is used as a variable or storage location that is referenced at later times. In step 254, the next event in the sequence is obtained and stored in the CE location. In addition, the Next Event (NE) variable is set to the next event (that is, the event following the CE event) in the sequence, step 256. Here, CE is set to the next event since compression cannot occur until at least two events are recognized.

The CE and NE variables also are used to store the type of event that has occurred.

For instance, an event type might be "mouse movement," "key m activated," or "mouse position <x, y>," where x and y are coordinates indicating the position of the mouse. At step 258, the system determines whether the CE and NE variables are of the same type. If the CE and NE variables are not the same type, then the system concludes that no compression can be performed and proceeds to step 264 to look for further events in the sequence.

If CE and NE are of the same type, the system further determines whether CE is of the type that is compressible, step 260. If CE is not a compressible type, the system again advances to step 264 to look for additional events in the sequence. If, however, CE is compressible, CE is simply deleted from the sequence, step 262.

The system continues at step 264 where it checks to see if the end of the sequence has been reached. If there are further events in the sequence, the event located in NE is transferred to CE, step 266, and the system returns to step 256, where NE is set to the next event in the sequence. If there are no additional events in the sequence, the system comes to an end at step 268.

An example of compression is shown, for illustrative purposes, in FIG. 13. This figure may represent, for instance, the process recorded for using the mouse to use the FileOpen command. At step 252, the system recognizes that the sequence of events (having already been recorded at step 404 of FIG. 7) shown in FIG. 13(*a*) are longer than one, step 252. We will suppose that the user performs some event, such as moving the mouse.

At step 258, the system determines that the events represented by blocks 500, 502 are of the same type, step 258, and of a type that is compressible, step 260. Accordingly, the first event, block 500, is deleted from the sequence, as shown in the compressed diagram of FIG. 13(*b*). Block 502 is retained in the compressed state, as indicated by block 512.

However, the next event, is a MouseClick, block 504, which is a different type than the prior event, which was a MouseMove, block 502. Accordingly, at step 258, the system realizes that these two events cannot be compressed, and so proceeds to the next event in the sequence back to step 256. Block 504 is retained in the compressed state, as shown by block 514 of FIG. 13(*b*). The next event is a MouseMove, block 506, which again is a different type than the prior event, the MouseClick of block 504. Thus, another compression does not occur until the next MouseMove is recognized in block 508.

As with blocks 500, 502, blocks 506 and 508 are of the same compressible type, steps 258, 260, and are therefore compressed by deleting block 506. Block 508 survives compression, as shown by block 516 in FIG. 13(*b*). Since the final event of the sequence, block 510, is a different type than the prior event, block 508, no further compression is made, and the system stops, step 268, since no further events are in the sequence, step 264. Hence, the event represented by block 510 is shown as block 518 in FIG. 13(*b*).

Thus, in the compressed state, two MouseMoves, 502, 508 are deleted. This is possible since the system recognizes that the number of times a same type of event occurs is not critical, and only the fact that a different type of event is recognized is important. Thus, the extraneous events are removed.

Convert Sequence to Finite State Machine (FSM)

Characterizations view target applications, that is, the application being characterized, as a Finite State Machine (FSM). All user inputs, by keyboard or mouse, change the state of the machine. As the user performs actions using the keyboard and/or mouse, messages are generated that serve as input to the FSM.

The FSM accepts all input messages and potentially changes state in response to each input event. The FSM determines whether a final state is entered, wherein the FSM has knowledge of the user's actions. If a final state is entered, it is logged by the FSM. A sequence of final states is used to determine the action or sequence of actions performed by the user.

Figure 10:
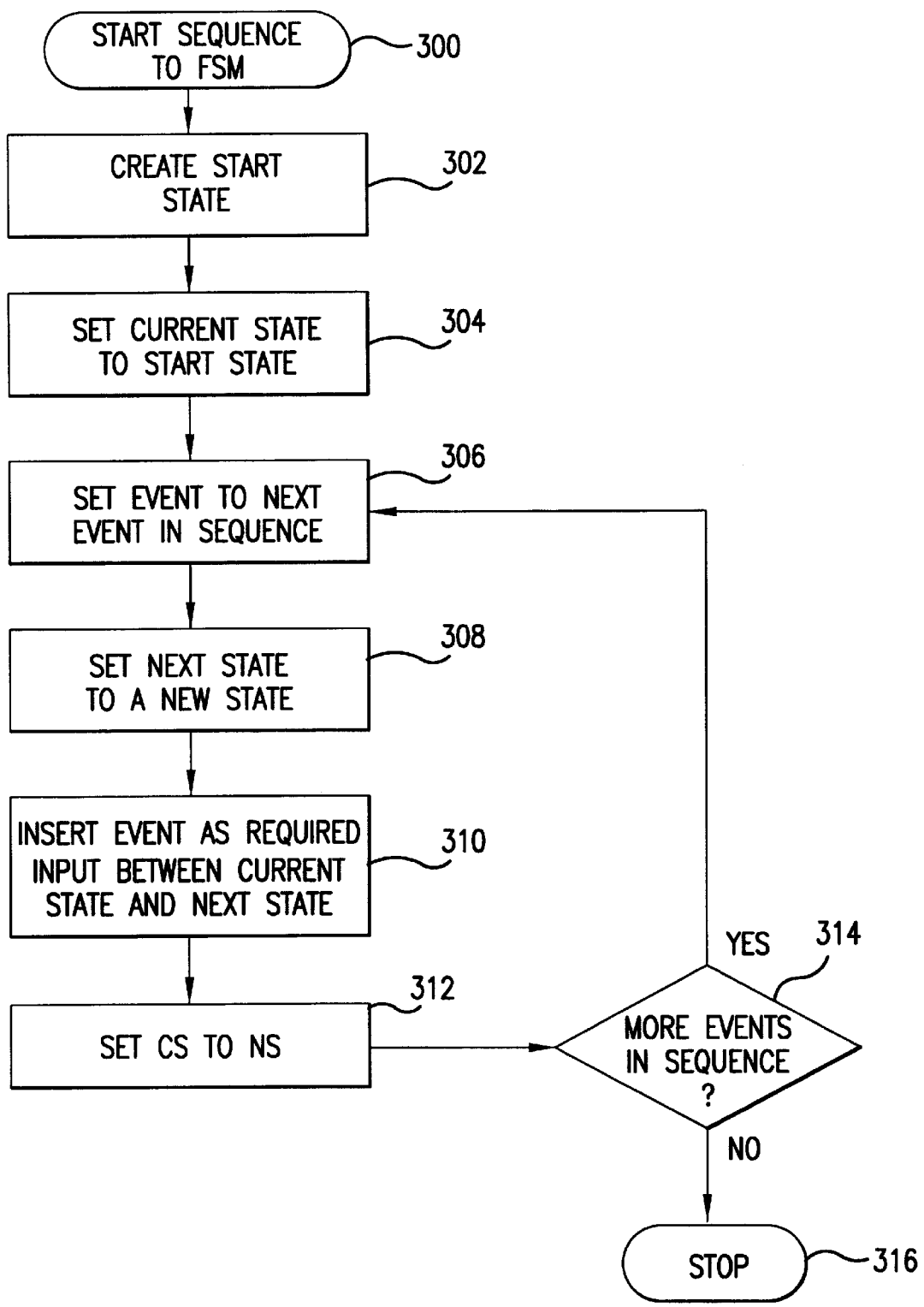
FIG. 10 is a flow diagram showing operation of the Convert Sequence to Finite State Machine (FSM) Mode for the process of building evaluation graphs in FIG. 7.

In FIG. 10, sequences are converted into a Finite State Machine (FSM). In the present diagram, there are three (3) variables: Current State (CS), Event, and Next State (NS). Current State and Next State represent arbitrary states. A correlation between Current State and Next State is created when Event is added as the required input to transition from Current State to Next State. Therefore, if the system is at Current State, upon the receipt of an event that is equivalent to Event, Current State will change to Next State.

The process starts in step 300, and proceeds to create a start state, or first state, of the FSM, step 302. The variable Current State is set to the start state, step 304. In step 306, the system sets Event to the next event in the sequence of events. Thus, the next event in the sequence to be converted is stored in the variable Event. A new state is then created and Next State is set to the new state, step 308, for reasons that will become apparent.

At this point, there are two states, Current State and Next State, and one event, Event. In a FSM, a transition from one state to another occurs because a certain input was received. In step 310, all that happens is that the input event contained in Event causes a transition from Current State to Next State. Thus, at step 310, the Event is inserted as the required input between Current State and Next State.

The value of the Next State is then moved to Current State. This allows the system to create a new Next State in order to continue building the FSM from the Current State to the Next State. At step 314, the system checks to see if there are any further events in the sequence. If further events exist, the system returns to step 306, where Event is again set to the Next Event in the sequence. Otherwise, the process ends at step 316. Accordingly, the mode Convert Sequence to FSM essentially cycles through the events in a sequence to build a FSM one event at a time.

Continuing with our example discussed in relation to compression, the compressed sequence of FIG. 13(*b*) will now be converted to an FSM. Thus, the sequence of FIG. 13(*b*) is now shown in FIG. 14(*a*). At step 302, the start state is created, block 558. In step 306, the system gets the first event in the sequence, block 550 of FIG. 14(*a*), here the MouseMove, which is represented as block 560 of FIG. 14(*b*). This event is then stored in a variable referred to as Event, step 306.

At step 308, State 1 is created, block 562. At step 310, the two states referred to by Current State(CS) and Next State (NS) are related in the following manner: namely, the event in Event serves as the input required to cause a transition from the state in CS to the state in NS. This is shown in FIG. 14(*b*) when a transition from the Start State, block 558, to State 1, at block 562, occurs when a MouseMove event 560 is received as the input to the Start State 558. At step 312, the system moves the state in NS to CS; namely, CS now contains State 1, block 562.

Since there are more events in the sequence in FIG. 14(*a*) at step 314, the system proceeds to step 306 and sets Event to the next event in the sequence, namely MouseClick 552. At step 308, State 2 is created, block 566. At step 310, the system inserts Event as the input for a transition between State 1, block 562, and State 2, block 566, and then sets CS to State 2, block 566, in step 312.

This loop occurs two more times for the sequence of FIG. 14(*a*); once for MouseMove 554 and once for MouseClick 556. MouseMove 554 becomes the required input for a transition between State 2, block 566, and State 3, block 570. MouseClick 556 becomes the required input for a transition between State 3, block 570, and State 4, block 574. After this, at step 314, there are no more events remaining in the sequence contained in FIG. 14(*a*). Therefore, the system advances to step 316 and the conversion is complete.

Assimilate Finite State Machines (FSM)

The object of assimilation is to combine two FSMs, designated FSM1 and FSM2, into a third FSM called FSM3. Once the FSM1 and FSM2 are passed to the system, for instance from step 410 of FIG. 7, the process begins, step 350 of FIG. 11. First, the system determines equivalent states, step 352. Typically, some states in FSM1 will exist that are equivalent to states in FSM2. These equivalent states (ES) reflect the same information about the state of the target application. As part of step 352, the equivalent states are then marked in both FSM1 and FSM2.

In the example given above with reference to building an evaluation graph in FIG. 7, suppose the application engineer records a first sequence for the action of clicking the File menu. If the application engineer records a second sequence unrelated to the first sequence, such as selecting to Print a document, the number of equivalent states, if any, will be few. Given that these two sequences, or actions, are unrelated, the only Equivalent State in the two FSMs will be the start state.

Now, however, suppose the application engineer instead extends the first sequence by a second sequence of clicking the Open option in the File menu. Here, when the two FSMs are assimilated, the FSMs will have more than just the start state as an Equivalent State. This is because the new action (clicking the File Menu followed by clicking the Open item) totally encompasses the actions in the master (or first) FSM (just clicking the File Menu). So, these two FSMs are assimilated and there are two informative states in the master FSM. Namely, the supervising application can detect when the user has clicked the File Menu, and can also detect when the user has clicked the Open Item.

Step 352 can be performed by the user (i.e., the application engineer that creates the characterization) by selecting equivalent states, or the system can determine the equivalent states by assuming that the user has assigned the same name. That is, as the user records sequences to be incorporated into the evaluation graph, the user will be asked to provide meaningful names for certain states.

Consider, for example, that the user creates a state named FileMenu. This state would reflect that the FileMenu has been made visible in an application. This can be done in various ways, however, this state still reflects useful information and has a name that is meaningful to the application engineer.

Proceeding to step 354, a new FSM, namely FSM3, is created. Initially, FSM3 is empty. However, states and transitions will be added to FSM3 from FSM1 and FSM2. Thus, FSM3 represents the variable or storage location for a new FSM, and is a means for referring to the new FSM.

States are then added from FSM1 to FSM3 until an Equivalent State is reached, step 356. In this step, the system performs a breadth-first traversal of FSM1, adding all states and transitions visited to FSM3 until a state marked as an Equivalent State, in step 352, is reached in FSM2. Then, states from FSM2 are added to FSM3, step 358, until an equivalent state reached.

The equivalent states (one from FSM1 and one from FSM2) are then combined and added to FSM3, step 360. The next state (in the breadth-first traversal) in FSM1 is equivalent to the next state (in breadth-first traversal) in FSM2. Therefore, at step 360, these two equivalent states can be combined and added as a single state to FSM3.

The system checks for additional equivalent states, step 362, and, if an ES is located, the system returns to step 356. In this step, since the states in FSM1 and FSM2 are equivalent, for every ES in FSM1, there will be a corresponding ES in FSM2. Namely, there is a state in FSM1 that is equivalent to a state in FSM2; hence, these two states are referred to as equivalent.

The system will continue looping, steps 356–362, until there are no more equivalent states. Otherwise, the system adds the remaining states and transitions in FSM1 to FSM3, step 364. Then, the remaining states and transitions in FSM2 are added to FSM3, step 366, and the process comes to an end at step 368. At this point, FSM3 contains the assimilation of FSM1 and FSM2.

Figure 15A:
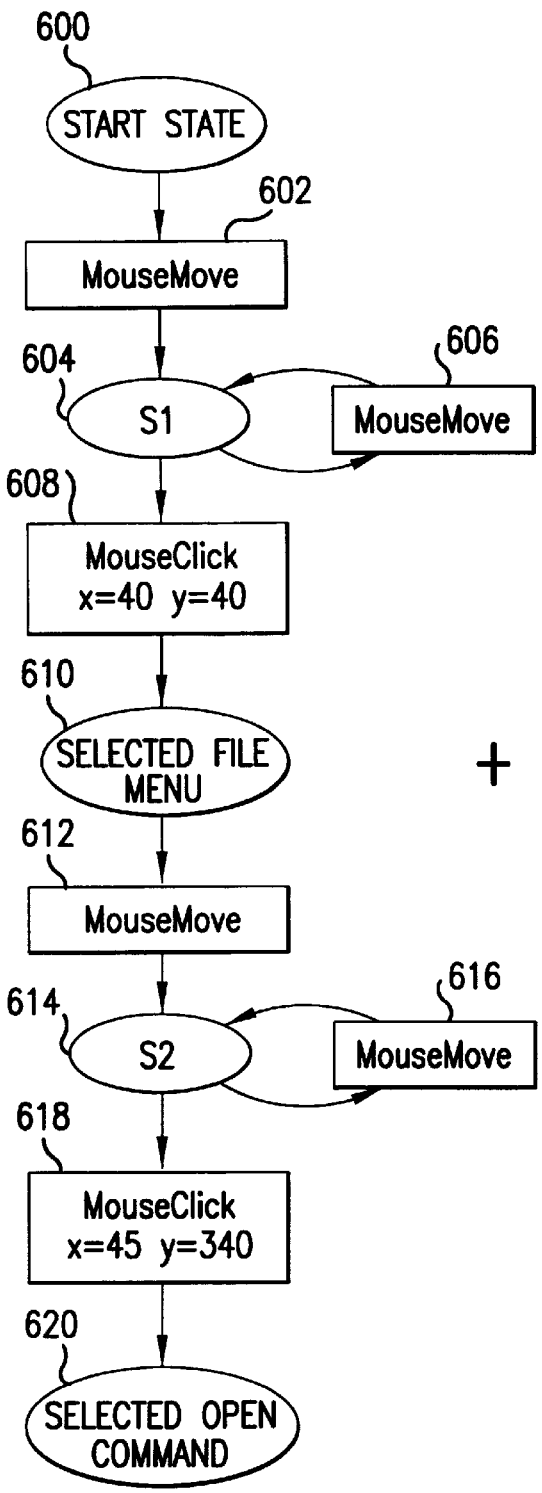
FIGS. 15(a)–15(c) and 16(a)–16(c) are storyboard flow diagrams illustrating assimilation of two FSMs into a single FSM in accordance with the process of FIG. 11.
Figure 15B:
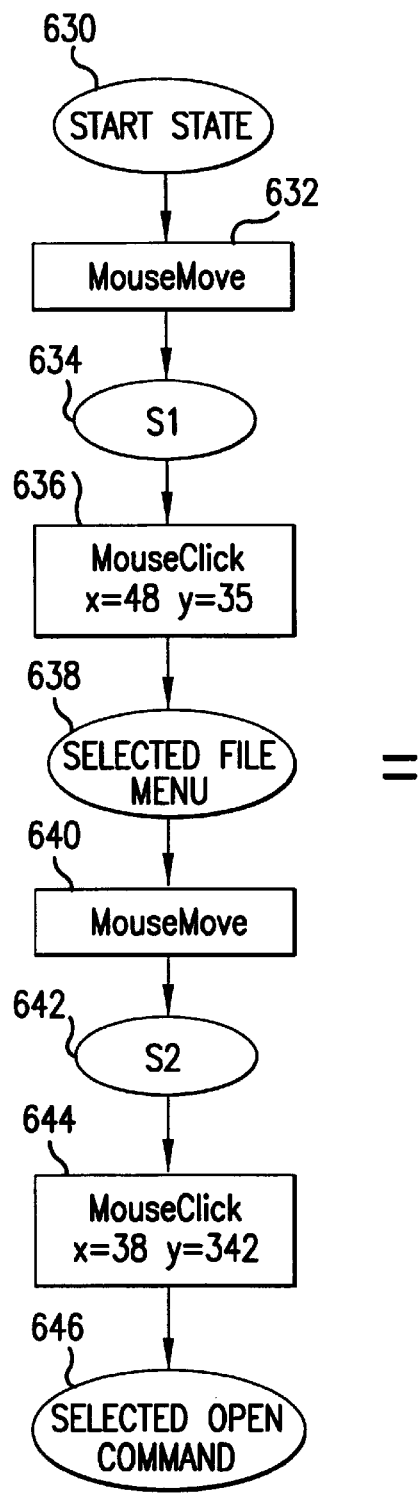

An example of assimilation is shown, for instance, FIG. 15. Here, FSM1 is shown in FIG. 15(*a*), FSM2 is shown in FIG. 15(*b*), and the assimilation of FSM1 and FSM2 is shown FIG. 15(*c*) as FSM3. In the present example, FSM1 and FSM2 are substantially identical and reflect the sequence of clicking on File menu, then Open command.

At step 352, equivalent states are determined for FSM1 and FSM2, which for FIGS. 15(*a*) and (*b*) are the following pairs: blocks 600 and 630, 604 and 634, 610 and 638, 614 and 642, 620 and 646. The system determines these equivalent pairs by allowing the user to pick the equivalent states from the two FSMs being assimilated. The application engineer, for instance, will be prompted to assign a name to states when the sequence is converted to an FSM (FIG. 10).

Blocks 606 and 616 are positioned to the side of blocks 604 and 614, respectively, to indicate that a state does not change when a same type of event occurs, MouseMove 602, 606. Thus, once state S1, block 604, is entered, further MouseMoves 606 will not change the state.

Having determined the equivalent states, the system proceeds to step 354 to create FSM3, which initially contains no states. At step 356, states from FSM1, FIG. 15(*a*), are added to FSM3, FIG. 15(*c*), until an equivalent state is reached. However, the first state of FSM1, namely 600, is an equivalent state and no states are yet added to FSM3.

At step 358, the same situation occurs for FSM2 FIG. 15(*b*) since block 630 is also an equivalent state. At step 360, the equivalent states from FSM1 and FSM2 are combined into a single state in FSM3. Therefore, 600 and 630 are combined to produce the Start State in FSM3, block 660. In addition, the transitions for state 600 and state 630 are also added to the new state in 660. Accordingly, blocks 602 and 632 are added to FSM3 as block 662. Since blocks 602 and 632 are of the same type, namely MouseMove, they are represented as a single transition. Since there are more equivalent states in FSM1 and FSM2 at step 362, the system continues processing at step 356.

Once again, no states are added to FSM3 from steps 356 or 358 since the next state in FSM1, 604, is an equivalent state and the next state in FSM2, 634, is an equivalent state. At step 360, 604 and 634 are combined to produce the state S1, 664, in FSM3. The transitions from 604 and 634 are also added to 664. Here, block 604 has two transitions, namely the MouseMove 606 and the MouseClick 608. The MouseMove is added to FSM3 as 666 and the MouseClick is added to FSM3 as 668.

Block 634 has a single transition, namely the MouseClick 636, which is combined with the MouseClick transition for 664, namely 668. The coordinates for the MouseClick 668 are updated to incorporate the coordinates from 636. At block 668, the system recognizes a bounded block in which the mouse was clicked in each of blocks 608, 636. Although the mouse was clicked at separate coordinates in blocks 608, 636, they are recognized as equivalent transitions leading to the action of selecting File Menu. Accordingly, the system assumes that the two clicks occur in the same bounded box.

Figure 15C:
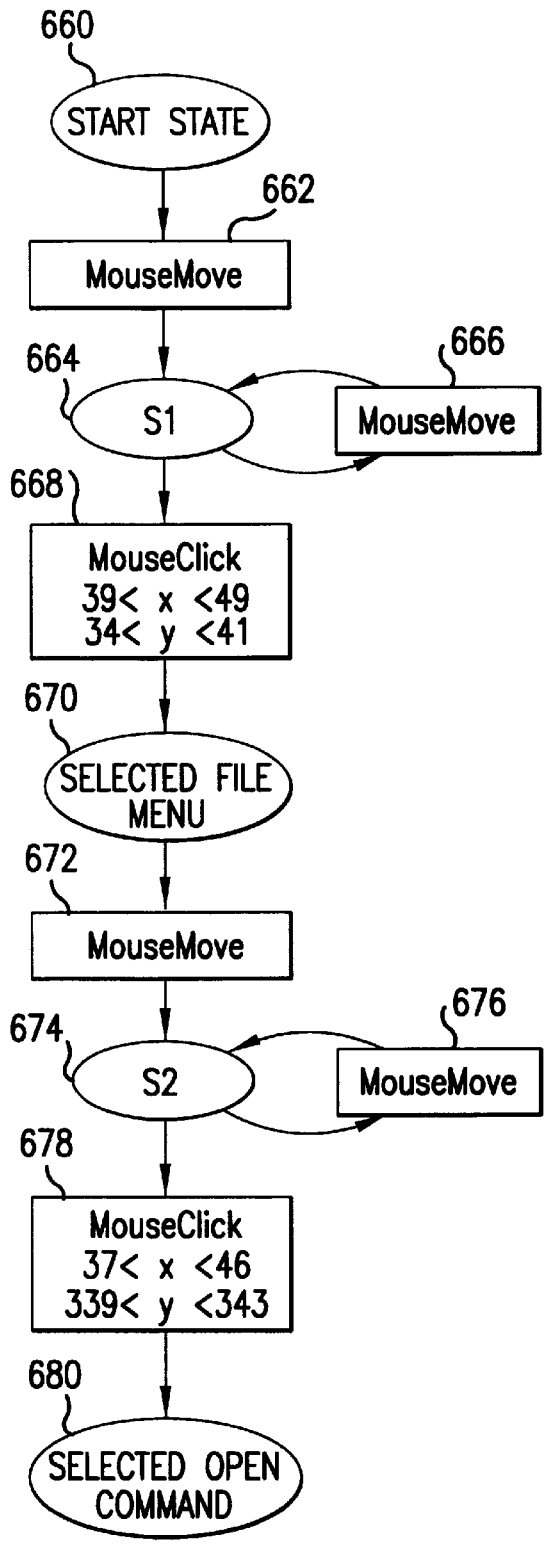

Since all of the states in FSM1 and FSM2 are equivalent, the above described process continues to combine blocks 610–620 and 638–646 as blocks 670–680 as such until states 620 and 646 have been combined and added to FSM3 as state 680. Then, at step 362, there are no more equivalent states and the system continues to step 364. No more states are remaining in FSM1 or in FSM2, so steps 364 and 366 have no effect on FSM3. At step 368, the assimilation is finished, and the newly created FSM3 is shown in FIG. 15(c).

Figure 11:
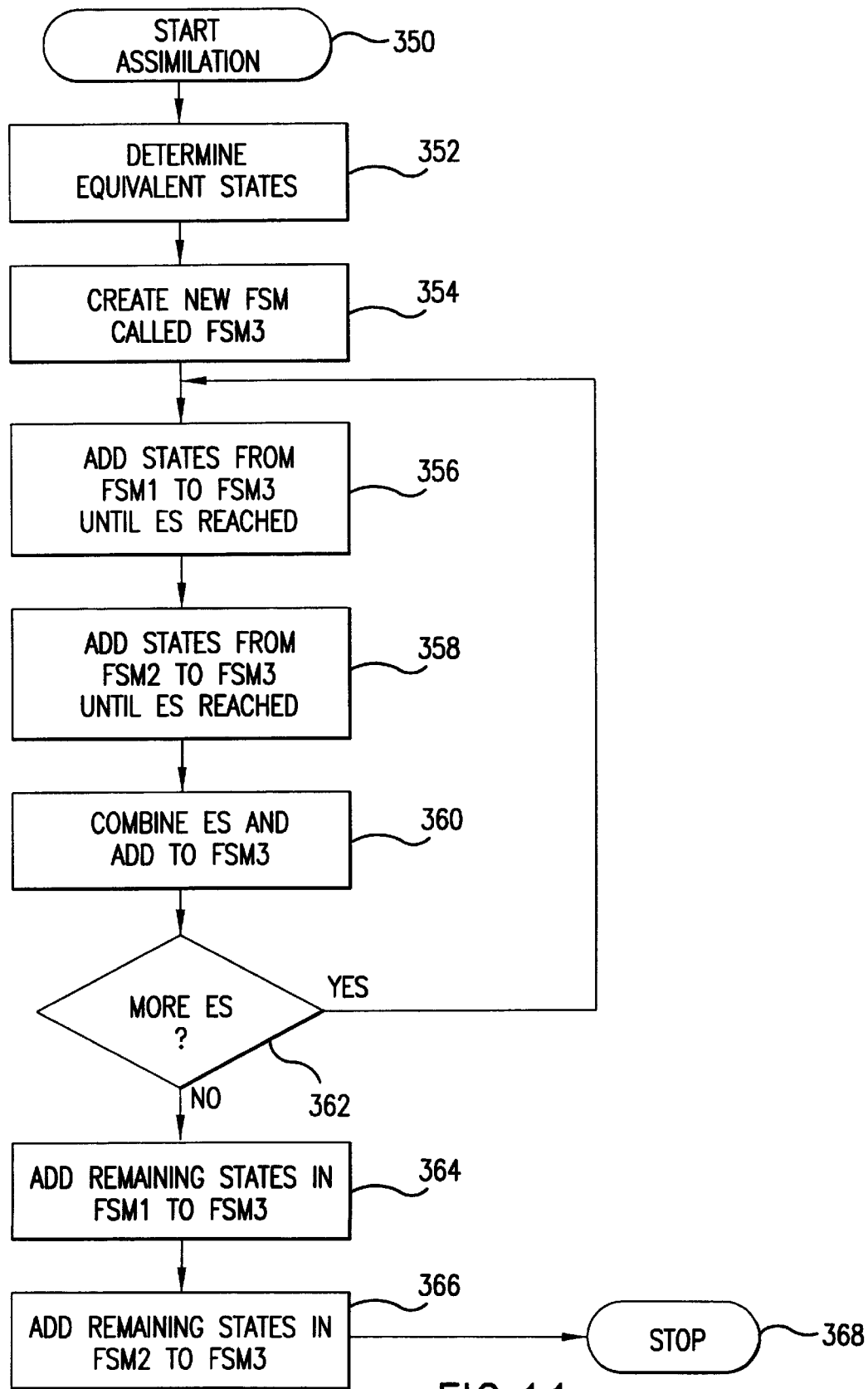
FIG. 11 is a flow diagram showing operation of the Assimilate FSM Mode for the process of building evaluation graphs shown in FIG. 7.
Figure 16A:
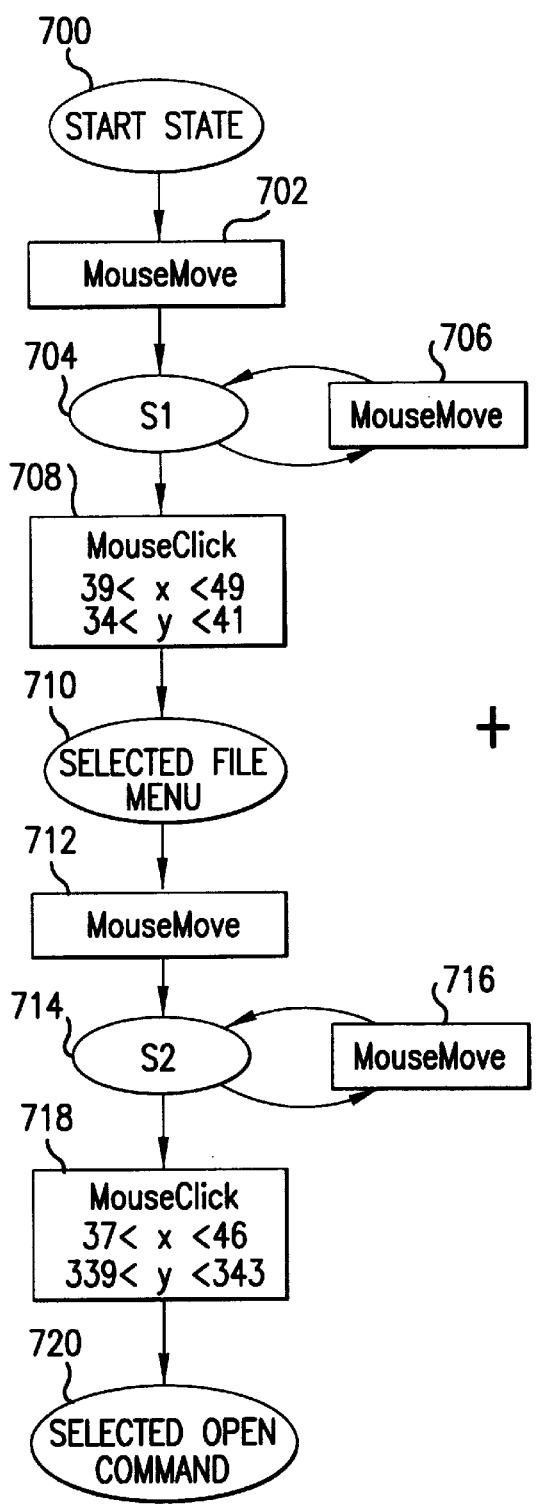
Figure 16B:
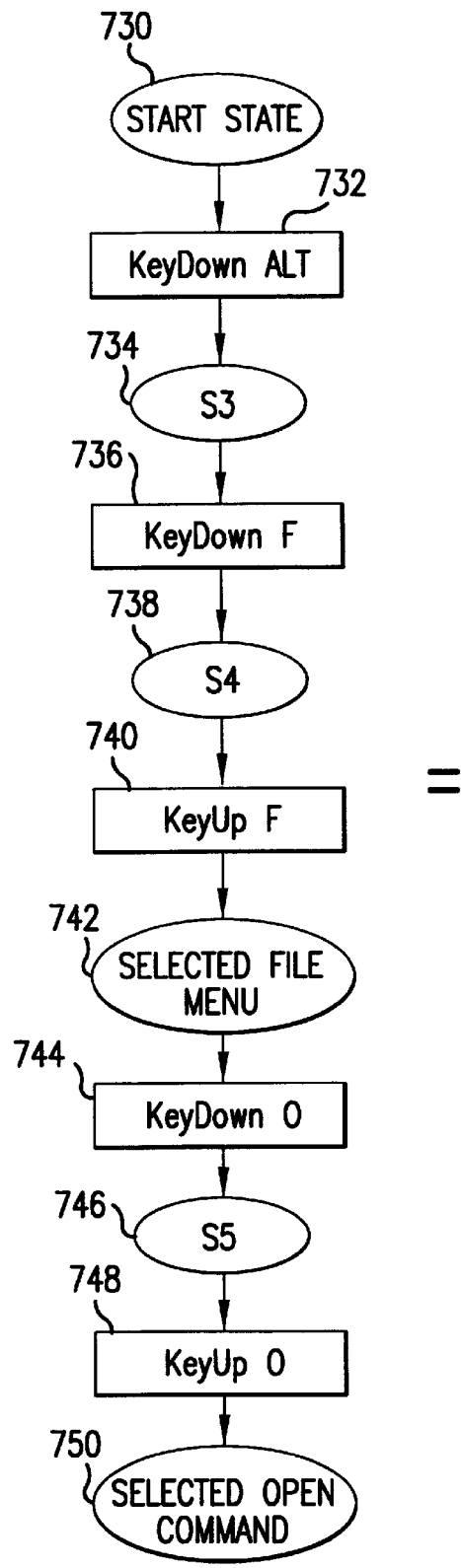
Figure 16C:
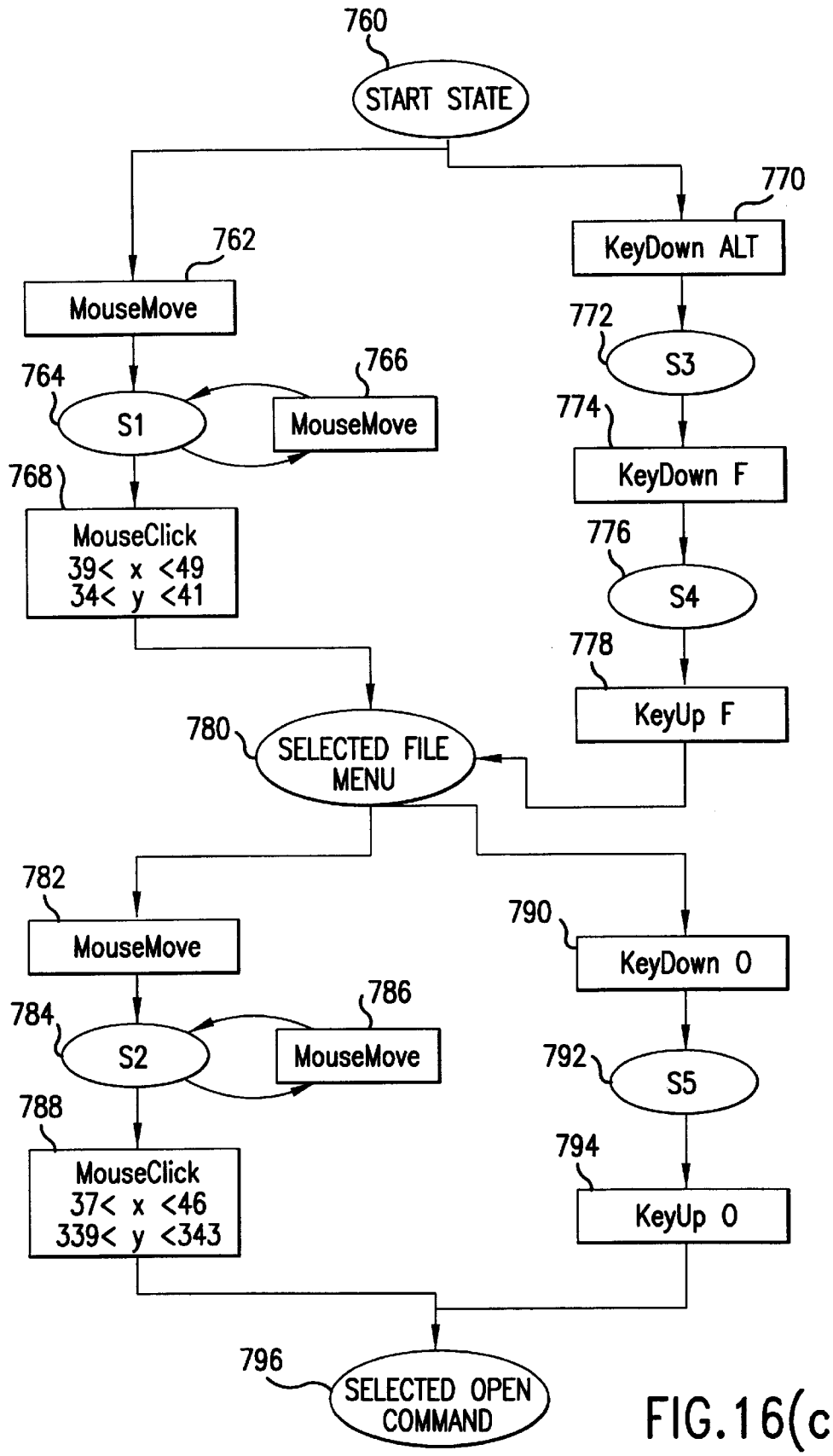

FIG. 16 shows yet another example of the assimilation process discussed in FIG. 11. Here, FSM1 is shown in FIG. 16(a), FSM2 is shown in FIG. 16(b) and FSM3, the assimilation of FSM1 and FSM2, is represented in FIG. 16(c). FSM1 corresponds to a sequence of using a mouse to select File Menu, then the Open command, whereas FSM2 selects File Menu and then the Open command by using a keyboard. Hence, as reflected in FIGS. 16(a) and (b), the sequences are markedly different.

At step 352, equivalent states are determined. Here, the equivalent states are determined to be the following pairs: blocks 700 and 730, 710 and 742, 720 and 750. Since sequences for FSM1 and FSM2 are more divergent from each other than the FSM1 and FSM2 in FIGS. 15(a) and (b), respectively, there are fewer equivalent states in the present example than there were in the example of FIG. 15.

Having determined the equivalent states, the system now proceeds to step 354 and creates FSM3. Since the first state of both FSM1 and FSM2, namely 700 and 730, are both equivalent states, no action is performed by steps 356 and 358. At step 360, 700 and 730 are combined to create the first state in FSM3, namely 760. Their transitions, namely 702 and 732 are also added to FSM3 as 762 and 770 respectively.

At step 362, since FSM1 and FSM2 have further equivalent states, assimilation is continued at step 356. Here, states S1 704 and its transitions, 706 and 708, are added to FSM3. However, state 710 is not added yet since it is an equivalent state. The added state and transitions are seen in FSM3 as 764, 766, and 768 respectively. For FSM2 at step 358, states S3 734 and its transition 736 are added to FSM3 as state 772 and transition 774. In addition, block 738 and its transition 740 are entered into FSM3 as blocks 776 and 778, respectively. At step 360, states 710 and 742 are combined into state 780 for FSM3 since they are equivalent. Transitions 712 and 744 are further added to FSM3 as 782 and 790, respectively.

The above described process is repeated for blocks 714–720 and 746–750, which are combined as blocks 784–788, 792–794 and 796 in FSM3. This process continues until the equivalent states 720 and 750 are added as state 796 in FSM3. At this point, the system is at step 362 and there are no more equivalent states; therefore, the system continues to step 364. Since there are no remaining states in FSM1 and FSM2, steps 364 and 366 perform no action and the process continues to step 368 and are finished assimilating FSM1 and FSM2 into FSM3. The finished assimilated product, FSM3, is shown in its entirety in FIG. 16(c).

Characterizations

As described above, the APR application 132 is used to play and record various target application sequences for instructing users. In addition, with the addition of a characterization process, the APR application 132 is able to monitor the use of a target application and provide a high-level description of what events are taking place within the application. An application characterization includes a window-map and an evaluation graph (or finite-state-machine representation) of the application. Characterization generally involves informing the APR application 132 about various events corresponding to menus, buttons, and windows within the target application. Events are dependent upon the operating system being used. However, common events include: RightButtonClick, LeftButtonClick, MouseMove, KeyDown (a key is pressed), KeyUp (a key is released), WindowCreation, WindowMove, WindowResize, WindowDestroy, and WindowIconify. Once the APR application 132 (or separate characterization application 134) has learned the basic graphical layout of an application, common sequences can be recorded and labeled so that the APR can monitor a user's ability to use the application.

Characterizations of target applications are used to process, record and playback sequences, and to provide a high-level description of a user's actions within a target application. Application engineers can capture various levels of detail about operations within a target application by creating or modifying characterizations of applications. The characterizations are, therefore, specific to the target applications used in the overall system. Different characterizations are generated for different target applications. Also, different characterizations capturing different levels of detail can be created for the same target application. The characterizations are also useful to tie one target application to one or more other target applications.

During characterization, an application engineer (1) loads the target application to be characterized, (2) informs the APR application 132 that a sequence is about to begin, and (3) begins recording a sequence. After the sequence is complete, the engineer notifies the APR application 132 that the sequence has ended. At that point, the APR application 132 prompts the engineer for a name for the sequence and stores the name and sequence for later use. For instance, the engineer may record the sequence of opening a file, within a word processing application by recording the events corresponding to clicking on the menu bar above the word "File," option, exposing the File menu, selecting "Open" from the File menu, creating (or exposing) the "File Open" dialog box (including any associated sub-windows), tracking mouse movements and button clicks within the dialog box, and the hiding or destroying of the created or exposed windows. At the end of the sequence, a name is provided. It is noted that additional information may be required for time-varying events. For example, when recording a File Open at a first time, the position of the file name is at a first position within the File Open dialog box. Later, when the sequence is replayed, because of file additions or deletions, the desired file may not be located at the same position within the dialog box, but rather at a second position. Thus, sending a mouse down event to the dialog box at the first position would be inappropriate. In such cases, it would be beneficial for the APR application 132 also to receive from the dialog box the name of the file selected. Thus, when the sequence is played back, the APR application 132 would send the corresponding high level message back to the dialog box requesting that the corresponding file is open (without having to know its location within the dialog box). Similarly, when saving the file, the file to be saved may already exist on a user's machine when the "save" sequence is played. This may cause a confirmation dialog box to appear which must be dismissed. The events to dismiss the dialog box, however, were not part of the original sequence. Thus, the APR application 132 must handle contingency events also to ensure that the evaluation component does not misdiagnose the user's dismissal as an incorrect method of performing an action.

As can be seen, even conceptually simple actions for an experienced user can provide several opportunities for mistakes by inexperienced users. In addition, by recording long sequences, the system is unable to provide high-level descriptions of the intermediate steps involved. Accordingly, it is preferable to record a series of shorter sequences that can be concatenated by the present invention into a "supersequence". For example, the simple first step of selecting the "File" menu can be stored as its own named sequence. Later, the named sequence of selecting "Open" from the File menu can be appended to the "File Menu" sequence. Thus, a user's actions can be more closely tracked, and more fine-grained instruction can be provided.

The APR application 132 further supports multiple applications (Microsoft Excel, WordPerfect, etc.) through application characterizations. An APR application characterization will map application specific command sequences onto the APR execution model. For example, cutting a set of spreadsheet cells from Excel and pasting them into WordPerfect can be recorded and named.

Commercial off-the-shelf target applications may be characterized, and can be further customized by an application engineer. The APR may also be used in a stand-alone mode. Application command sequences can be recorded by one individual and sent via electronic mail to other users for execution, provided the end user has an APR application and the target application installed.

The foregoing descriptions and drawings should be as illustrative only of the principles of the invention. The invention may be configured in a variety of shapes and sizes and is not limited by the dimensions of the preferred embodiment. Numerous applications of the present invention will readily occur to those skilled in the art. Therefore, it is not desired to limit the invention to the specific examples disclosed or the exact construction and operation shown and described. Rather, all suitable modifications and equivalents may be resorted to, falling within the scope of the invention.

What is claimed is:

1. A computer program product, comprising:

a computer storage medium and a computer program code mechanism embedded in the computer storage medium for causing a computer to monitor events in a computer system, the computer program code mechanism comprising:

a first computer code device configured to identify a target application;

a second computer code device configured to intercept events performed by the target application;

a third computer code device configured to record the events intercepted by the second computer code device; and a fourth computer code device configured to perform one of: (1) replaying the events recorded by the third computer code device on said computer and (2) sending the events recorded by the third computer code device to a remote computer for execution.

2. The computer program product as claimed in claim 1, further comprising:

a fifth computer code device configured to build a finite state machine representing the events recorded by the third computer code device; and a sixth computer code device configured to evaluate the efficiency of a user based on the events recorded by the third computer code device and the finite state machine built by the fifth computer code device.

3. The computer program product as claimed in claim 1, further comprising:

a fifth computer code device configured to receive the events recorded by the third computer code device at a remote computer.

4. The computer program product as claimed in claim 1, further comprising:

a fifth computer code device configured to compress the events recorded by the third computer code device.

5. The computer program product as claimed in claim 1, further comprising:

a fifth computer code device configured to build first and second finite state machines representing portions of the events recorded by the third computer code device; and a sixth computer code device configured to merge the first and second finite state machines.

6. The computer program product as claimed in claim 1, wherein the third computer code device comprises a fifth computer code device configured to record mouse events.

7. The computer program product as claimed in claim 1, wherein the third computer code device comprises a fifth computer code device configured to record keyboard events.

* * * * *

UNITED STATES PATENT AND TRADEMARK OFFICE
CERTIFICATE OF CORRECTION

PATENT NO.    : 6,099,317
DATED         : August 8, 2000
INVENTOR(S)   : Robert Allan Bullwinkel et al.

It is certified that error appears in the above-identified patent and that said Letters Patent is hereby corrected as shown below:

Before the "Cross-Reference to co-pending application" section, column 1, line 3, please insert the following:

-- This invention was made with Government support under contract number F33615-94-C-1494 awarded by the U.S. Air Force. The Government has certain rights in the invention. --

Signed and Sealed this

Sixteenth Day of October, 2001

*Attest:*

*Attesting Officer*

NICHOLAS P. GODICI
*Acting Director of the United States Patent and Trademark Office*